(12) United States Patent
Koneru et al.

(10) Patent No.: US 12,170,743 B2
(45) Date of Patent: *Dec. 17, 2024

(54) SYSTEMS AND METHODS FOR HANDLING CUSTOMER CONVERSATIONS AT A CONTACT CENTER

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Rajavardhan Nalluri, Hyderabad (IN)

(73) Assignee: Kore.ai, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,686

(22) Filed: Feb. 9, 2024

(65) Prior Publication Data

US 2024/0187524 A1 Jun. 6, 2024

Related U.S. Application Data

(63) Continuation of application No. 17/559,606, filed on Dec. 22, 2021, now Pat. No. 11,936,812.

(51) Int. Cl.
*H04M 3/51* (2006.01)
*G10L 15/26* (2006.01)
*H04M 3/493* (2006.01)

(52) U.S. Cl.
CPC ........... *H04M 3/5175* (2013.01); *G10L 15/26* (2013.01); *H04M 3/4936* (2013.01); *H04M 2203/403* (2013.01)

(58) Field of Classification Search
CPC ............ H04M 3/5175; H04M 3/4936; H04M 2203/403; H04M 2201/40; H04M 2203/357; H04M 3/5166; G10L 15/26
See application file for complete search history.

(56) References Cited

U.S. PATENT DOCUMENTS

| | | | |
|---|---|---|---|
| 11,562,743 B2* | 1/2023 | Shir | G10L 15/065 |
| 11,881,208 B2* | 1/2024 | Badary | G10L 15/02 |
| 11,947,629 B2* | 4/2024 | Dwivedi | G06F 40/295 |
| 12,086,550 B2* | 9/2024 | Sapugay | G06F 40/35 |
| 2024/0176958 A1* | 5/2024 | Raimondo | G06N 3/0455 |
| 2024/0193231 A1* | 6/2024 | Dwivedi | G06F 40/30 |
| 2024/0269566 A1* | 8/2024 | Howard | A63F 13/54 |

* cited by examiner

*Primary Examiner* — Lisa Hashem
(74) *Attorney, Agent, or Firm* — Troutman Pepper Hamilton Sanders LLP

(57) ABSTRACT

A contact center server receives an input from a customer device as part of a conversation. The contact center server (CCS) identifies at least one of: one or more intents, one or more entities, or one or more entity values from the input. The CCS detects one or more escalation conditions based on the input and pauses the conversation based on the detected one or more escalation conditions. The CCS outputs a conversation transcript and the identified one or more intents, the one or more entities, or the one or more entity values to an agent device. The CCS receives agent-identified-information or agent-modified-information from the agent device. Subsequently, the CCS resumes the conversation by providing a response to the input based on the received agent-identified-information or the agent-modified-information.

18 Claims, 16 Drawing Sheets

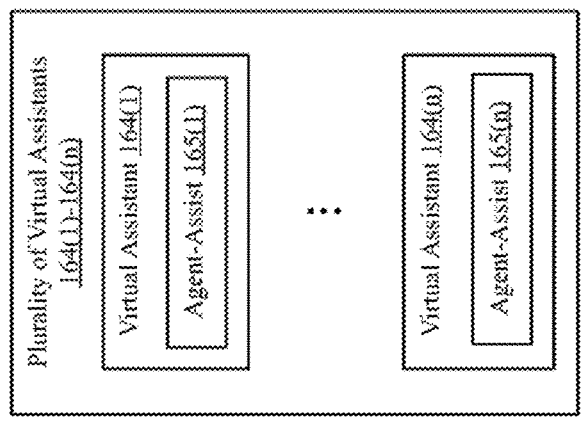

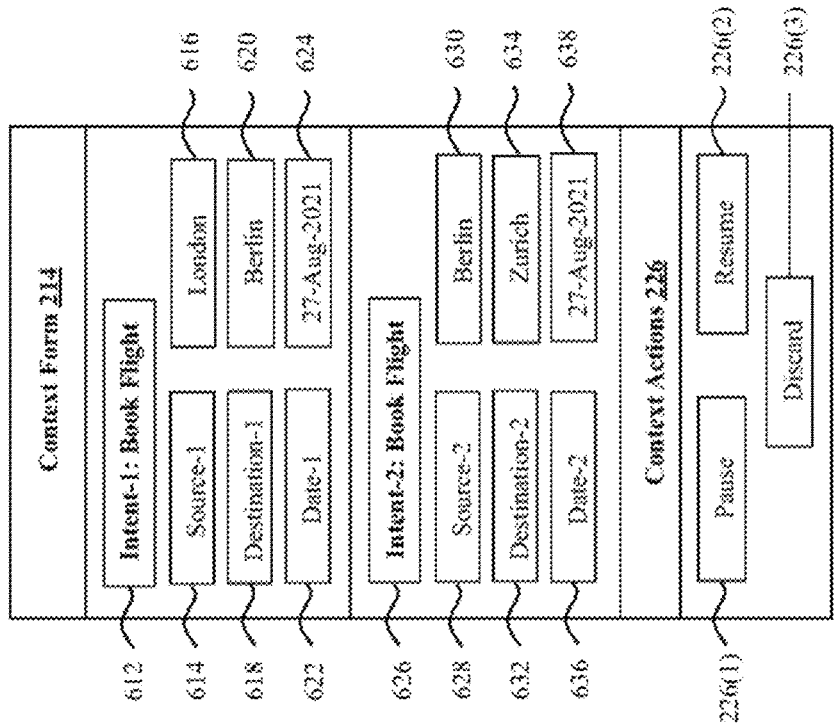
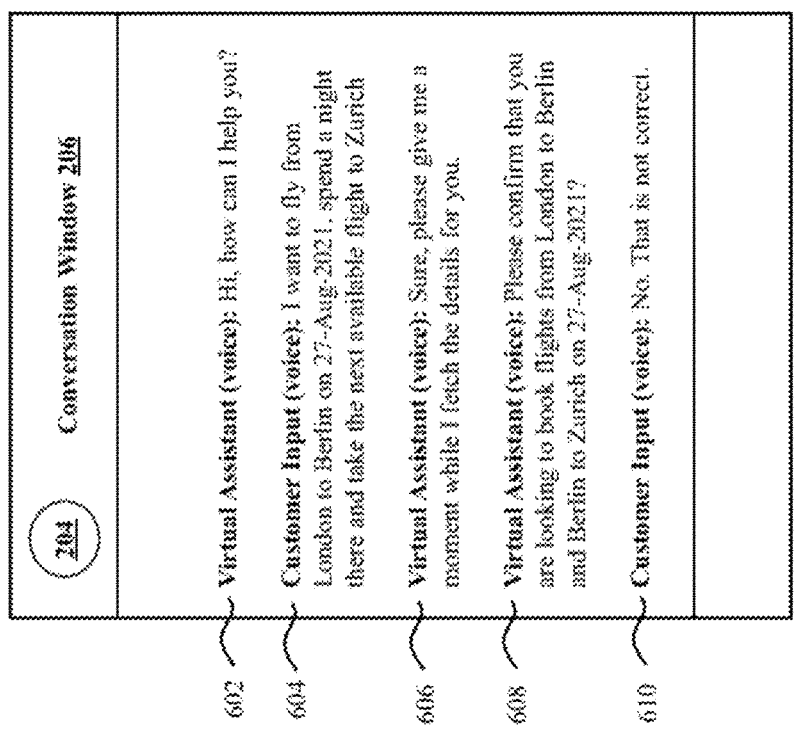
FIG. 6B
FIG. 6A

SYSTEMS AND METHODS FOR HANDLING CUSTOMER CONVERSATIONS AT A CONTACT CENTER

This application is a continuation of prior U.S. patent application Ser. No. 17/559,606, filed Dec. 22, 2021, which is hereby incorporated by reference in its entirety.

FIELD

This technology generally relates to contact centers, and more particularly to methods, systems, and computer-readable media for assisting customers using a virtual assistant and a human agent.

BACKGROUND

Traditionally, enterprises use interactive voice response (IVR) systems as a first touch point for customer issue resolution. These IVR systems are not intelligent, include complicated, long-winded menu trees and often result in customers requesting a call transfer to a human agent for issue resolution. This results in the customers spending a substantial amount of time on call, initially navigating the IVR menu and subsequently waiting to connect to the human agent. The high volume of calls transferred from the IVR systems to human agents increases the contact center costs. The human agents may also lack the expertise to resolve the issue and transfer the call to a supervisor, further adversely affecting the customer experience.

Recently, enterprises are employing automated response systems (e.g., virtual assistants, chatbots, or the like) to serve their customers. In one example, the enterprises exclusively use virtual assistants for the contact centers. The customers can interact with the virtual assistants of the enterprise using voice or text to access information, complete tasks, execute transactions, get assistance, get resolution for issues, or the like. The virtual assistants replace complicated IVR menu with natural language processing, machine learning, and other forms of intelligence to understand the content and context of customer requests, enabling a free-form and dynamic customer experience. Although, the virtual assistants may effectively handle simple requests, they may not always be able to handle and resolve complex customer requests.

The virtual assistants may escalate complex customer requests to the human agents for resolution. In one example, after a request is escalated, the human agent needs to read through the conversation transcript of the conversation that took place between the virtual assistant and the customer to understand the context, intent, and problems of the customer. This is a time-consuming activity and affects the resolution time and the customer experience.

Thus, the drawbacks of the existing approaches may result in customers—expressing dissatisfaction and negative sentiment, providing negative feedback, providing low rating, abandoning conversations, or the like, which in turn affect key performance indicators (KPIs) of the contact center such as—customer satisfaction score (CSAT), customer effort score (CES), net promoter score (NPS), average handling time (AHT) of a request, first-call resolution, service level, contact quality, or the like. Hence, there is a need to improve the handling of customer interactions at the contact centers.

SUMMARY

An example method for handling customer conversations at a contact center server (CCS) includes receiving, by the CCS, an input from a customer device as part of a conversation. Further, the CCS identifies at least one of: one or more intents, one or more entities, or one or more entity values corresponding to the one or more entities from the input. Further, the CCS detects one or more escalation conditions based on the input. Further, the CCS pauses the conversation based on the detected one or more escalation conditions. Further, the CCS outputs a conversation transcript of the conversation and at least one of: the identified one or more intents, the one or more entities, or the one or more entity values to an agent device. Further, the CCS receives from the agent device at least one of: (i) an agent-identified-information corresponding to the input, or (ii) an agent-modified-information corresponding to at least one of: the identified one or more intents, the one or more entities, or the one or more entity values. Subsequently, the CCS resumes the conversation by providing a response to the input based on at least one of: the received agent-identified-information or the agent-modified-information.

In another example, a contact center server (CCS) for handling customer conversations includes a processor and a memory coupled to the processor which is configured to be capable of executing programmed instructions stored in the memory to: receive an input from a customer device as part of a conversation. Further, at least one of: one or more intents, one or more entities, or one or more entity values corresponding to the one or more entities from the input are identified. Further, one or more escalation conditions are detected based on the input. Further, the conversation is paused based on the detected one or more escalation conditions. Further, a conversation transcript of the conversation and at least one of: the identified one or more intents, the one or more entities, or the one or more entity values are output to an agent device. Further, at least one of: (i) an agent-identified-information corresponding to the input, or (ii) an agent-modified-information corresponding to at least one of: the identified one or more intents, the one or more entities, or the one or more entity values are received from the agent device. Subsequently, the conversation is resumed by providing a response to the input based on at least one of: the received agent-identified-information or the agent-modified-information.

In another example, a non-transitory computer-readable medium storing instructions which when executed by a processor, causes the processor to: receive an input from a customer device as part of a conversation. Further, at least one of: one or more intents, one or more entities, or one or more entity values corresponding to the one or more entities from the input are identified. Further, one or more escalation conditions are detected based on the input. Further, the conversation is paused based on the detected one or more escalation conditions. Further, a conversation transcript of the conversation and at least one of: the identified one or more intents, the one or more entities, or the one or more entity values are output to an agent device. Further, at least one of: (i) an agent-identified-information corresponding to the input, or (ii) an agent-modified-information corresponding to at least one of: the identified one or more intents, the one or more entities, or the one or more entity values are received from the agent device. Subsequently, the conversation is resumed by providing a response to the input based on at least one of: the received agent-identified-information or the agent-modified-information.

BRIEF DESCRIPTION OF THE DRAWINGS

FIG. 1A is a block diagram of a plurality of virtual assistants of the contact center environment illustrated in FIG. 1.

FIGS. 6A-6C are example wireframes of the conversation window and the context form displayed to the human agent in the graphical user interface in accordance with an example where the human agent is modifying identified entities or entity values in the context form.

DETAILED DESCRIPTION

Examples of the present disclosure relate to a contact center environment and, more particularly, to one or more components, systems, computer-readable media and methods of the contact center environment. The contact center environment serving a customer at one of the customer devices 110(1)-110(n) using a virtual assistant is configured to take the assistance of a contact center agent, hereinafter referred to as a "human agent", at one of the agent devices 130(1)-130(n), by way of example, to provide faster and efficient assistance to the customer at one of the customer devices 110(1)-110(n) who gets in touch with the contact center. Also, the contact center environment is configured to assist the human agent using the virtual assistant at one of the agent devices 130(1)-130(n). In one example, the virtual assistant may assist the human agent at one of the agent devices 130(1)-130(n) by suggesting responses to be sent to the customer at one of the customer devices 110(1)-110(n) or actions to be taken, based on an ongoing conversation between the human agent at one of the agent devices 130(1)-130(n) and the customer at one of the customer devices 110(1)-110(n), such that the human agent at one of the agent devices 130(1)-130(n) may provide quick and efficient assistance to the customer at one of the customer devices 110(1)-110(n).

Figure 1:
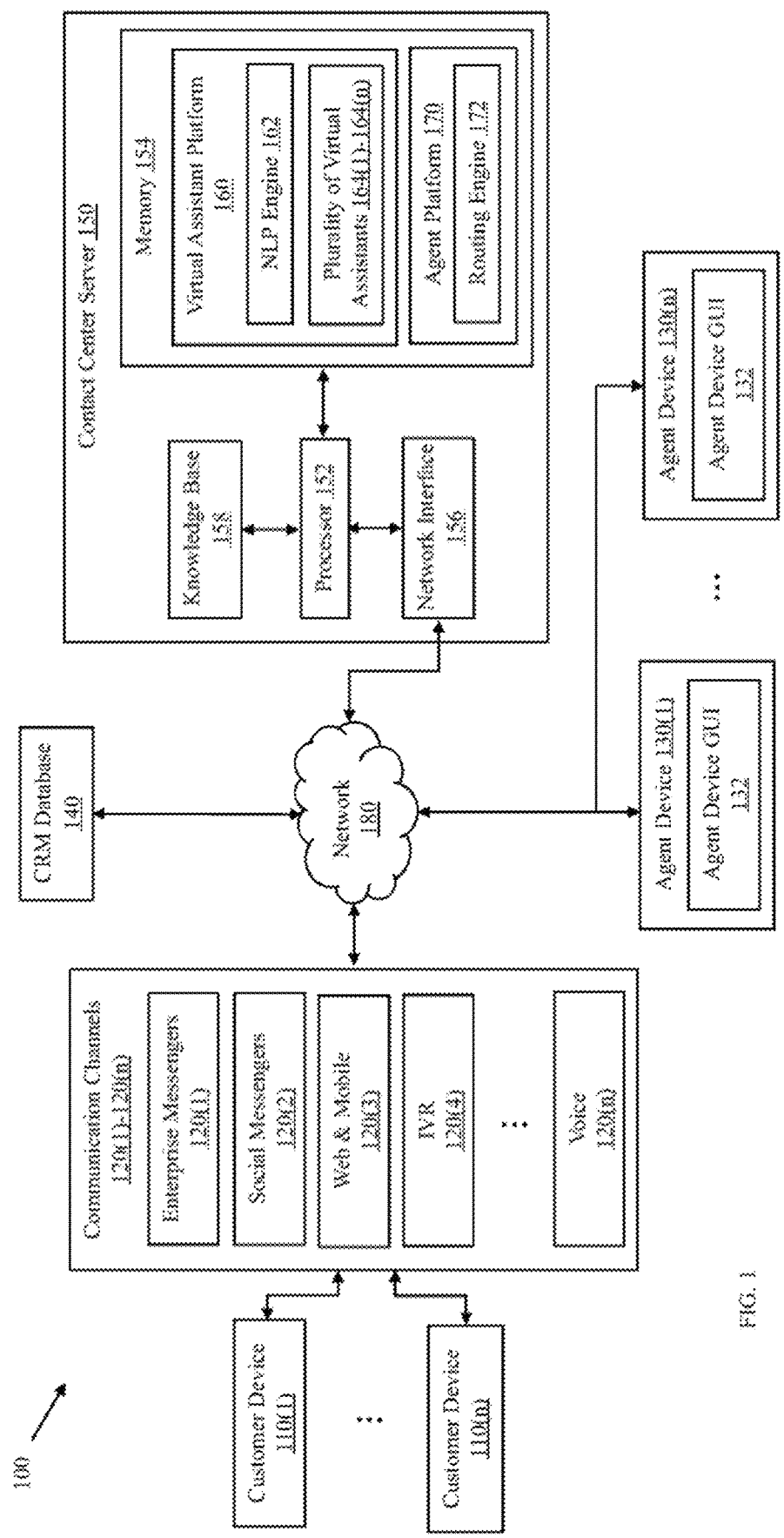
FIG. 1 is a block diagram of an exemplary contact center environment for implementing the concepts and technologies disclosed herein.

FIG. 1 is a block diagram of an exemplary contact center environment 100 for implementing the concepts and technologies disclosed herein. The environment 100 includes: a plurality of customer devices 110(1)-110(n), a plurality of communication channels 120(1)-120(n), a plurality of agent devices 130(1)-130(n), a customer relationship management (CRM) database 140, and a contact center server (CCS) 150 coupled together via a network 180, although the environment 100 can include other types and numbers of systems, devices, components, and/or elements and in other topologies and deployments. Although not shown, the exemplary environment 100 may include additional network components, such as routers, switches and other devices, which are well known to those of ordinary skill in the art and thus will not be described here.

Referring to FIG. 1, the CCS 150 handles requests of customers at one or more of the customer devices 110(1)-110(n) reaching the CCS 150 via voice and digital channels. The CCS 150 may use automation and artificial intelligence (e.g., virtual assistants), human agents, or a combination of virtual assistants and the human agents to address customer requests. In one example, a customer request may be directly transferred to a human agent at one of the agent devices 130(1)-130(n). In another example, the customer request may be initially handled by the CCS 150 as part of a conversation and then transferred to the human agent at one of the agent devices 130(1)-130(n) at a later point in the conversation when intervention of the human agent is required. Further, at a later point of time, the customer conversation may be transferred from the human agent at one of the agent devices 130(1)-130(n) to the CCS 150 when the intervention of the human agent is no longer required. In another example, the human agent at one of the agent devices 130(1)-130(n) may handle the conversation with the customer at one of the customer devices 110(1)-110(n) and the CCS 150 may provide response suggestions or action suggestions to the human agent at one of the agent devices 130(1)-130(n) to handle the conversation.

The CCS 150 includes a processor 152, a memory 154, a network interface 156 and a knowledge base 158, although the CCS 150 may include other types and/or numbers of components in other configurations. In addition, the CCS 150 may include an operating system (not shown). In one example, the CCS 150 and/or processes performed by it may be implemented using a networking environment (e.g., cloud computing environment). In one example, the CCS 150 may be offered as a service by the cloud computing environment.

The components of the CCS 150 may be coupled to each other by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, a Small Computer Systems Interface (SCSI) bus, or a combination of two or more of these.

The processor 152 of the CCS 150 may execute one or more computer-executable instructions stored in the memory 154 for the methods illustrated and described with reference to the examples herein, although the processor can execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the CCS 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable storage medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may include instructions corresponding to a virtual assistant platform 160 and an agent platform 170 of the CCS 150, although other types and/or numbers of instructions in the form of programs, functions, methods, procedures, definitions, subroutines, or modules may be stored. The CCS 150 receives communication from the plurality of customer devices 110(1)-110(n) and uses the virtual assistant platform 160 or the agent platform 170 to provide a response to the communication.

The network interface 156 may include hardware, software, or a combination of hardware and software, enabling the CCS 150 to communicate with the components illustrated in the environment 100, although the network interface 156 may enable communication with other types and/or number of components in other configurations. In one example, the network interface 156 provides interfaces between the CCS 150 and the network 180. The network interface 156 may support wired or wireless communication. In one example, the network interface 156 may include an Ethernet adapter or a wireless network adapter to communicate with the network 180.

The plurality of customer devices 110(1)-110(n) may communicate with the CCS 150 via the network 180. The customers at one or more of the customer devices 110(1)-110(n) may access and interact with the functionalities exposed by the CCS 150 via the network 180. The plurality of customer devices 110(1)-110(n) may include any type of computing device that can facilitate customer interaction, for example, a desktop computer, a laptop computer, a tablet computer, a smartphone, a mobile phone, a wearable computing device, or any other type of device with communication and data exchange capabilities. The plurality of customer devices 110(1)-110(n) may include software and hardware capable of communicating with the CCS 150 via the network 180. Also, the plurality of customer devices 110(1)-110(n) may render and display the information received from the CCS 150. The plurality of customer devices 110(1)-110(n) may render an interface of any of the plurality of communication channels 120(1)-120(n) which the customers may use to communicate with the CCS 150. The plurality of customer devices 110(1)-110(n) and the CCS 150 may communicate via one or more application programming interfaces (APIs) or one or more hyperlinks exposed by the CCS 150.

The customers at one or more of the customer devices 110(1)-110(n) may communicate with the CCS 150 by providing text input or voice input via any of the plurality of communication channels 120(1)-120(n). The plurality of communication channels 120(1)-120(n) may include channels such as, for example, enterprise messengers 120(1) (e.g., Skype for Business, Microsoft Teams, Kore.ai Messenger, Slack, Google Hangouts, or the like), social messengers 120(2) (e.g., Facebook Messenger, WhatsApp Business Messaging, Twitter, Lines, Telegram, or the like), web & mobile channels 120(3) (e.g., a web application, a mobile application), interactive voice response (IVR) channels 120(4), voice channels 120(n) (e.g., Google Assistant, Amazon Alexa, or the like), live chat channels (e.g., LivePerson, LiveChat, Zendesk Chat, Zoho Desk, or the like), a webhook channel, a short messaging service (SMS), email, a software-as-a-service (SaaS) application, voice over internet protocol (VoIP) calls, computer telephony calls, or the like. The customers at one or more of the customer devices 110(1)-110(n) may communicate with the CCS 150 using one or more of the plurality of communication channels 120(1)-120(n) via the network 180. It may be understood that to support voice-based communication channels, the environment 100 may include, for example, a public switched telephone network (PSTN), a voice server, a text-to-speech (TTS) engine, and an automatic speech recognition (ASR) engine, which are not illustrated in FIG. 1.

The human agents may operate the plurality of agent devices 130(1)-130(n) to interact with the CCS 150, the CRM database 140, or the plurality of customer devices 110(1)-110(n) via the network 180. In one example, the human agents at one or more of the agent devices 130(1)-130(n) may access the knowledge base 158 and the CRM database 140 via one or more application programming interfaces (APIs) or one or more hyperlinks or one or more uniform resource locators (URLs). The plurality of agent devices 130(1)-130(n) may be, for example, a desktop computer, a laptop computer, a tablet computer, a smartphone, a mobile phone, or any other type of device with communication and data exchange capabilities. The plurality of agent devices 130(1)-130(n) may include a plurality of communication devices (not shown) through which the human agents at one or more of the agent devices 130(1)-130(n) may communicate with the customers at one or more of the customer devices 110(1)-110(n) over a cellular, a mobile, or a telephone network. Also, the plurality of agent devices 130(1)-130(n) comprises an agent device graphical user interface (GUI) 132 that may render and display data received from the CCS 150 or the plurality of customer devices 110(1)-110(n). The plurality of agent devices 130(1)-130(n) may run applications such as web browsers or a contact center software, which may render the agent device GUI 132, although other applications may render the agent device GUI 132.

The plurality of customer devices 110(1)-110(n) or the plurality of agent devices 130(1)-130(n) may include one or more processors, one or more memories, one or more input devices such as a keyboard, a mouse, a display device, a touch interface, and one or more communication interfaces, which may be coupled together by a bus or other link, although each may have other types and/or numbers of other systems, devices, components, and/or other elements.

The network 180 enables the plurality of customer devices 110(1)-110(n), the plurality of agent devices 130

(1)-130(n), the CRM database 140, or other such devices to communicate with the CCS 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as, Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 180 may also support standards or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the CCS 150 may include any interface that is suitable to connect with any of the above-mentioned network types and communicate using any of the above-mentioned network protocols, standards or formats.

The CRM database 140 may store information related to customers including profile details (e.g., name, address, phone numbers, gender, age, occupation), communication channel preference for communicating with the human agent at one of the agent devices 130(1)-130(n) (e.g., text chat, SMS, voice chat, multimedia chat, social networking chat, web, telephone call), language preference, membership information (e.g., membership ID, membership category), and transaction data (e.g., communication session details such as: date, time, call handle time, issue type, transcripts, or the like). Further, the CRM database 140 may also store other information of past customer interactions such as: sentiment, emotional state, call deflection, feedback and ratings, or the like. Although depicted as an external component in FIG. 1, in one example, the CRM database 140 may be part of the CCS 150.

The CRM database 140 may be updated dynamically or periodically based on the customer conversations with the CCS 150 or the human agents at one or more of the agent devices 130(1)-130(n). In one example, the CRM database 140 may be updated with information related to the customer conversation such as, for example, attributes of the customer (e.g., customer name, address, phone number, email), attributes of the human agent at one of the agent devices 130(1)-130(n) who participated in the conversation (e.g., agent name, agent identifier), conversation time, conversation date, total handle time of the conversation, issue type handled, conversation transcript, customer emotion states, or customer feedback, to the CRM database 140 for future reference, although other types and/or numbers of information may be updated to the CRM database 140.

The knowledge base 158 of the CCS 150 may be a product-specific database, domain-specific database, or a combination of both that includes information about certain products and services in the form of, for example, frequently asked questions (FAQs), documents (e.g., articles, books, magazines), online content, hyperlinks, audio/video data, or graphical data that may be organized as relational data, tabular data, knowledge graph, or the like. The knowledge base 158 may be accessed by the human agents at one or more of the agent devices 130(1)-130(n), the virtual assistant platform 160, or the agent platform 170 to address customer requests. The human agents at one or more of the agent devices 130(1)-130(n) may search the knowledge base 158, for example, using the agent device GUI 132. The knowledge base 158 may be used to improve the productivity and quality of responses of the human agents at one or more of the agent devices 130(1)-130(n). The knowledge base 158 may be a dynamically updatable database. The knowledge base 158 may comprise a number of different databases, some of which may be internal or external to the CCS 150. Although there may be multiple databases, a single knowledge base 158 is illustrated in FIG. 1 for simplicity.

Further, the memory 154 of the contact center server 150 may include the virtual assistant platform 160 and the agent platform 170. The virtual assistant platform 160 and the agent platform 170 may be connected with each other using middleware. The virtual assistant platform 160 may host a natural language processing (NLP) engine 162 and a plurality of virtual assistants 164(1)-164(n) deployed by one or more enterprises, although the virtual assistant platform 160 may include other types and/or numbers of components in other configurations. The plurality of virtual assistants 164(1)-164(n) may be designed based on artificial intelligence and configured to communicate with the customers at one or more of the customer devices 110(1)-110(n) or the human agents at one or more of the agent devices 130(1)-130(n). The CCS 150 may use the plurality of virtual assistants 164(1)-164(n) to handle omni-channel conversations with the customers at one or more of the customer devices 110(1)-110(n).

The CCS 150 feeds inputs received from the plurality of customer devices 110(1)-110(n) to the virtual assistant platform 160. The NLP engine 162 of the virtual assistant platform 160 interprets the received inputs, identifies one or more intents of the inputs, and extracts one or more entities from the inputs. In one example, the NLP engine 162 may use machine learning techniques, semantic rules, component relationships, business rules, or the like to identify the one or more intents and extract the one or more entities from the inputs. For example, when an intent is identified by the NLP engine 162, a corresponding dialog flow of one of the plurality of virtual assistants 164(1)-164(n) is executed by the virtual assistant platform 160 of the CCS 150 to generate a response to the customer's input and output a response to the customer at one of the customer devices 110(1)-110(n).

The agent platform 170 of the CCS 150 facilitates communication between the CCS 150 and the plurality of agent devices 130(1)-130(n). The agent platform 170 includes a routing engine 172 which handles routing communication to the plurality of agent devices 130(1)-130(n), although the agent platform 170 may include other types and/or numbers of components in other configurations. In one example, the routing engine 172 manages transferring a communication session handled by one of the plurality of virtual assistants 164(1)-164(n) to one or more of the plurality of agent devices 130(1)-130(n). In another example, messages from the virtual assistant platform 160 may be output to the plurality of agent devices 130(1)-130(n) via the agent platform 170. The routing engine 172 may be configured with artificial intelligence including predictive models, or rules to route customer conversations to human agents.

The routing engine 172 transfers a customer conversation that requires human agent intervention to an available human agent operating one of the agent devices 130(1)-130(n) based on one or more transfer rules. The one or more transfer rules may include, for example: (1) path navigated by the customer at one of the customer devices 110(1)-110(n) in an IVR menu, (2) current emotion state of the customer at one of the customer devices 110(1)-110(n) (e.g., angry, frustrated), (3) behavioral history information of the customer at one of the customer devices 110(1)-110(n) collected and saved each time when the customer at one of the customer devices 110(1)-110(n) previously contacted the contact center (e.g., call/chat abandonments, preference to talk to a human agent), (4) feedback ratings given by the customer at one of the customer devices 110(1)-110(n) for the services received during past conversations, (5) account type of the customer at one of the customer devices 110(1)-110(n) (e.g., platinum, gold, silver), (6) waiting time of the customer at one of the customer devices 110(1)-110(n) in a common queue, (7) availability of the one or more human agents, (8) skill set of the available human agents, (9) average waiting time of the customer at one of the customer devices 110(1)-110(n) in a human agent queue, or the like. In one example, the one or more transfer rules may be stored in the memory 154 or maintained by the routing engine 172 itself.

In one example, the routing engine 172 may retrieve data regarding the skill set of the human agents at one or more of the agent devices 130(1)-130(n) of the contact center stored in a database of the CCS 150. The retrieved data may be used in transferring the customer conversation to one of the available human agents. In another example, if no human agent is available to handle the customer conversation, the routing engine 172 may place the customer conversation in the common queue until one or more human agents are available to take over the conversation. In an example, the common queue may be defined as a data structure maintained by the routing engine 172 to hold the customer conversations that need to be transferred to the available human agents for service. The routing engine 172 may comprise a programming module or one or more routing algorithms executed by the processor 152 to perform the routing functions based on the one or more transfer rules disclosed above.

Further, in view of FIG. 1, after the customer conversation is transferred to the human agent operating one of the agent devices 130(1)-130(n), the CCS 150 may provide the transcript of the conversation to the human agent at one of the agent devices 130(1)-130(n), so that the human agent at one of the agent devices 130(1)-130(n) can read-through to understand the intent of the customer at one of the customer devices 110(1)-110(n). In one example, the virtual assistant platform 160 of the CCS 150 may assist the human agent at one of the agent devices 130(1)-130(n) by suggesting one or more responses or actions based on the customer's input. In another example, the virtual assistant platform 160 may assist the human agent at one of the agent devices 130(1)-130(n) by suggesting one or more intents, one or more entities, or one or more entity values corresponding to the one or more entities that are identified from the customer's input. In another example, when a confidence score of the identified one or more intents is less than a threshold value, the virtual assistant platform 160 may suggest one or more intents to the human agent at one of the agent devices 130(1)-130(n) based on the input of the customer at one of the customer devices 110(1)-110(n).

An intent may be defined as a purpose of the customer at one of the customer devices 110(1)-110(n). The intent of the customer at one of the customer devices 110(1)-110(n) may be identified from the input provided by the customer at one of the customer devices 110(1)-110(n) and fulfilled by the CCS 150 using one or more virtual assistants, one or more human agents, or a combination of one or more virtual assistants and one or more human agents. Example intents include: book flight, book train, book cab, book movie ticket, restaurant search, ecommerce search, check balance, document search, or the like. To fulfill the intent, the virtual assistant platform 160 may need one or more entities defined by entity parameters including: an entity name, an entity type, an entity value, or the like, although there may be other types and/or numbers of entity parameters in other configurations. In an example, entity types may include: airport, address, city, company name, color, currency, product category, date, time, location, place name, etc. For example, in an input "book flight ticket from San Diego to New York", the intent of the customer at one of the customer devices 110(1)-110(n) is "book flight", and "San Diego" and "New York" are the entity values whose entity type is "city".

FIG. 1A is a block diagram of the plurality of virtual assistants 164(1)-164(n) of the CCS 150. Each of the plurality of virtual assistants 164(1)-164(n) may include rules, dialog flows, neural networks, or artificial intelligence based definitions, models or instructions. In one example, the enterprise user may create a dialog flow of each intent supported by the plurality of virtual assistants 164(1)-164(n). Based on the identified intent, a corresponding dialog flow will be executed by the virtual assistant platform 160 to generate a response to the customer's input at one of the customer devices 110(1)-110(n) and output the response to the customer at one of the customer devices 110(1)-110(n). In one example, the virtual assistant platform 160 may access the CRM database 140, the knowledge base 158, or one or more third party sources to generate the response. The dialog flow may comprise a network of nodes connected using conditions that define a sequence of steps to be executed in order to fulfil the intent of the customer at one of the customer devices 110(1)-110(n). For example, a travel virtual assistant may include intents such as—book flight, book train, book lounge, book cab, book hotel, etc., and the enterprise user may create a separate dialog flow for each of these intents. In one example, a virtual assistant 164(n) may access the CRM database 140, the knowledge base 158, or one or more third party sources to generate the response to the input of the customer at one of the customer devices 110(1)-110(n). In another example, the virtual assistant platform 160 may escalate the conversation to the human agent at one of the agent devices 130(1)-130(n) when required. The enterprise user may configure one or more of the plurality of communication channels 120(1)-120(n) for each of the plurality of virtual assistants 164(1)-164(n). The customers at one or more of the customer devices 110(1)-110(n) may use any of the plurality of communication channels 120(1)-120(n) that are configured to communicate with the CCS 150.

Further, in view of FIG. 1A, the plurality of virtual assistants 164(1)-164(n) include a plurality of agent-assist 165(1)-165(n) functionalities which the plurality of virtual assistants 164(1)-164(n) may use to assist the human agents at one or more of the agent devices 130(1)-130(n). For example, when the human agent at one of the agent devices 130(1)-130(n) is having a conversation with the customer at one of the customer devices 110(1)-110(n), an agent-assist 165(n) may assist the human agent at one of the agent devices 130(1)-130(n) by suggesting one or more responses, or one or more actions, based on customer inputs provided as part of the conversation. In one example, the human agent at one of the agent devices 130(1)-130(n) may send the suggested one or more responses to the customer as-is or after modifications. In another example, the human agent at one of the agent devices 130(1)-130(n) may ignore the one or more responses, or the one or more actions suggested by the agent-assist 165(n).

In one example, the plurality of agent-assist 165(1)-165(n) functionalities may be implemented using machine learning, neural network, or other artificial intelligence based techniques. In one example, each of the plurality of agent-assist 165(1)-165(n) functionalities may include one or more dialog flows that are executed upon an intent match. The dialog flows of the virtual assistant 164(n) may be of three types: dialog flows executed when the customer at one of the customer devices 110(1)-110(n) is conversing with the virtual assistant 164(n), dialog flows executed when the customer at one of the customer devices 110(1)-110(n) is conversing with the human agent at one of the agent devices 130(1)-130(n), or dialog flows executed when the customer at one of the customer devices 110(1)-110(n) is conversing with the virtual assistant 164(n) or the human agent at one of the agent devices 130(1)-130(n). Although FIG. 1A illustrates each of the plurality of virtual assistants 164(1)-164(n) including the plurality of agent-assist 165(1)-165(n) functionalities, it may be understood that one or more of the plurality of virtual assistants 164(1)-164(n) may not include the agent-assist functionality.

Figure 2A:
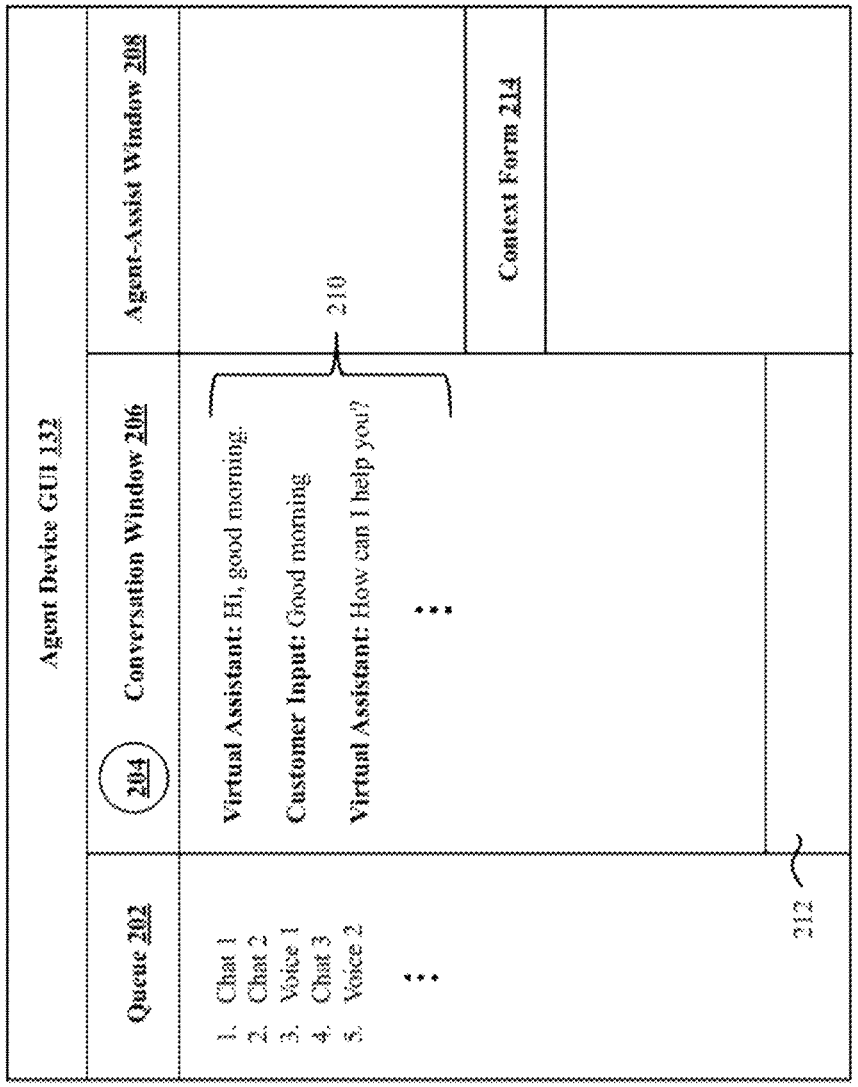
FIG. 2A is an example wireframe of a graphical user interface that is displayed to a human agent in an agent device.

FIG. 2A illustrates an example wireframe of an agent device graphical user interface (GUI) 132 provided by the CCS 150 to the human agent operating one of the plurality of agent devices 130(1)-130(n). The agent device GUI 132 may be displayed using a contact center software executable on the plurality of agent devices 130(1)-130(n), or a web page provided by the CCS 150 and rendered in a browser executable on the plurality of agent devices 130(1)-130(n), although the agent device GUI 132 may be displayed by other types and/or numbers of applications in other configurations. The contact center software or the web page provided by the CCS 150 enables the human agents at one or more of the agent devices 130(1)-130(n) to: communicate with the customers at one or more of the customer devices 110(1)-110(n), view information related to the customers or customer conversations, receive response suggestions or actions provided by the virtual assistant platform 160, search and retrieve information from the CRM database 140 or the knowledge base 158, communicate with third-party applications or databases, or the like. Further, the contact center software or the web page provided by the CCS 150 allows the CCS 150 to record conversations between the customers at one or more of the customer devices 110(1)-110(n) and the human agents at one or more of the agent devices 130(1)-130(n) and monitor performance of the human agents at one or more of the agent devices 130(1)-130(n).

As illustrated in FIG. 2A, the agent device GUI 132 may include a queue window 202, a conversation window 206, an agent-assist window 208, and a context form 214, although other types and/or numbers of windows, panels, or widgets may be included in other configurations. The queue window 202 shows a list of conversations (e.g., chat 1, chat 2, voice 1, chat 3, voice 2) that are transferred to the human agent by the routing engine 172. In one example, the list of conversations in the queue window 202 may be addressed or monitored by the human agent on a first-come-first-serve basis. In another example, the list of conversations in the queue window 202 may be prioritized based on one or more prioritization rules, so that the human agent may address the conversations on a priority basis. The prioritization rules may include, for example, customer type (e.g., premium customer, new customer), detected emotional state of the customer at one of the customer devices 110(1)-110(n) (e.g., angry, frustrated), number of times the conversation is transferred, wait and hold times of the customer at one of the customer devices 110(1)-110(n) in the common queue or the human agent queue, or the like.

The conversation window 206 may include a profile icon 204, a conversation transcript area 210, and a compose bar 212 for the human agent to compose and send a response to the customer at one of the customer devices 110(1)-110(n) during the conversation. The human agent may access the customer profile by clicking on the profile icon 204. For example, when the human agent clicks on the profile icon 204, the customer profile may be retrieved from the CRM database 140 and displayed to the human agent. In another example, when the human agent selects the conversation in the queue window 202, the customer profile may be automatically retrieved from the CRM database 140 and displayed to the human agent.

The customer profile may include information about the customer at one of the customer devices 110(1)-110(n), such as, for example, name, address, contact details, or account details of the customer at one of the customer devices 110(1)-110(n). The customer information may be retrieved from the CRM database 140 based on: a customer telephone/mobile number from which the customer at one of the customer devices 110(1)-110(n) contacted the contact center, customer identifier, or the like. In the conversation transcript area 210, the human agent may view the transcript of the conversation with the customer at one of the customer devices 110(1)-110(n) orchestrated by the CCS 150 via any of the plurality of communication channels 120(1)-120(n).

Figure 2B:
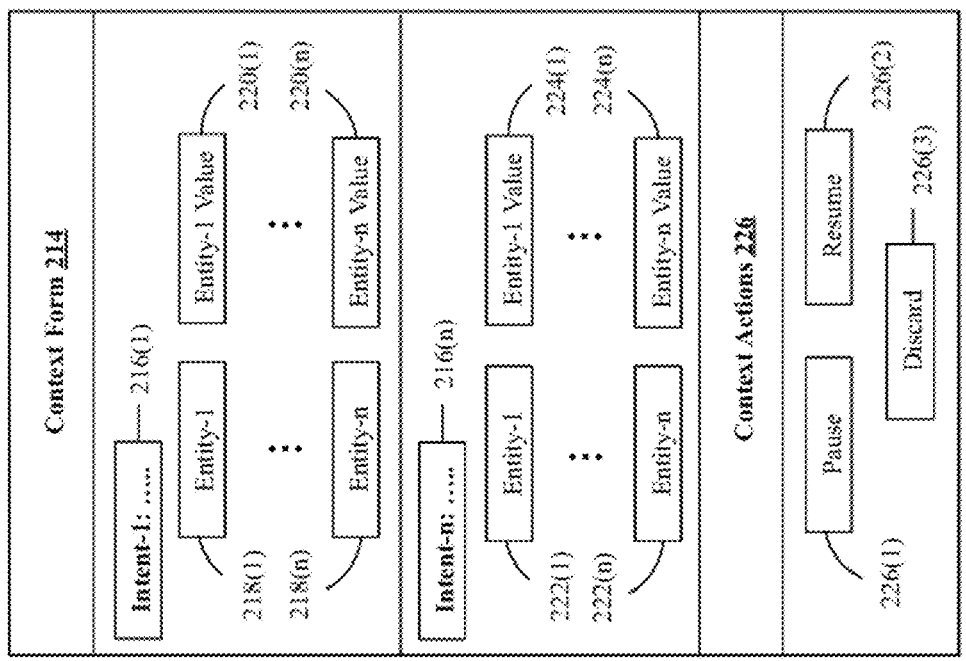
FIG. 2B is an example wireframe of a context form that is displayed to the human agent in the graphical user interface.

FIG. 2B illustrates an example wireframe of the context form 214 displayed in the agent device GUI 132. The CCS 150 may output to the human agent at one of the agent devices 130(1)-130(n) the context form 214.

The context form 214 may include:
1) one or more intents: "intent-1" 216(1) to "intent-n" 216(n);
2) one or more entities 218(1)-218(n) corresponding to the "intent-1" 216(1);
3) one or more entity values 220(1)-220(n) corresponding to the one or more entities 218(1)-218(n);
4) one or more entities 222(1)-222(n) corresponding to the "intent-n" 216(n);
5) one or more entity values 224(1)-224(n) corresponding to the one or more entities 222(1)-222(n);
6) one or more selection buttons 215(1)-215(n) corresponding to the one or more intents 216(1)-216(n); and
7) context actions area 226 including context actions: pause 226(1), resume 226(2), and discard 226(3).

Each of the one or more intents 216(1)-216(n) is configured to accept an intent name (e.g., "book flight", "book train", "book hotel"). Each of the one or more entities 218(1)-218(n) and 222(1)-222(n) is configured to accept an entity and each entity field is configured to have an entity type. For example, in a "book flight" intent, the entities may be source and destination of entity type—airport, city, etc. For example, in a "book train" intent, the entities may be source and destination of entity type—city, railway station, etc. Each of the one or more entity values 220(1)-220(n) and 224(1)-224(n) is configured to accept an entity value corresponding to the entity and entity type. The human agent at one of the agent devices 130(1)-130(n) may use one or more selection buttons 215(1)-215(n) to select one or more intents 216(1)-216(n) for execution by the CCS 150. In one example, the selection buttons 215(1)-215(n) may be implemented as radio buttons. In another example, the selection buttons 215(1)-215(n) may be implemented as checkboxes. For example, when the human agent at one of the agent devices 130(1)-130(n) selects one or more intents 216(1)-216(n) using the one or more selection buttons 215(1)-215(n) and clicks the context action—resume 226(2) in the context form 214, the CCS 150 resumes the conversation with the customer at one of the customer devices 110(1)-110(n) by executing the selected one or more intents 216(1)-216(n). Upon executing the selected one or more intents 216(1)-216(n), the CCS 150 outputs a response to the customer at one of the customer devices 110(1)-110(n).

It may be understood that the context form 214 may include other types and/or numbers of information in other configurations. Although in FIG. 2B, the context actions area 226 is shown as a portion of the context form 214, in an example, the context actions area 226 may be presented separately from the context form 214 in a separate window.

The human agent at one of the agent devices 130(1)-130(n) may monitor conversations handled by the CCS 150 using the conversation transcript and the context form 214. In one example, the human agent at one of the agent devices 130(1)-130(n) may read-through the conversation transcript and accordingly modify the one or more intents 216(1)-216(n) (e.g., intent names), the one or more entities: 218(1)-218(n), 222(1)-222(n) (e.g., entity names), or the one or more entity values: 220(1)-220(n), 224(1)-224(n) identified and populated in the context form 214 by the CCS 150.

In another example, the human agent at one of the agent devices 130(1)-130(n) may take over the conversation from the CCS 150 by pausing the conversation of the CCS 150 with the customer at one of the customer devices 110(1)-110(n) using the context action—pause 226(1). In another example, the human agent at one of the agent devices 130(1)-130(n) may hand-off the conversation to the CCS 150 using the context action—resume 226(2). In another example, the human agent at one of the agent devices 130(1)-130(n) may discard the one or more intents 216(1)-216(n), the one or more entities: 218(1)-218(n), 222(1)-222(n), or the one or more entity values: 220(1)-220(n), 224(1)-224(n) identified and populated in the context form 214 by the CCS 150, using the context action—discard 226(3).

Figure 3:
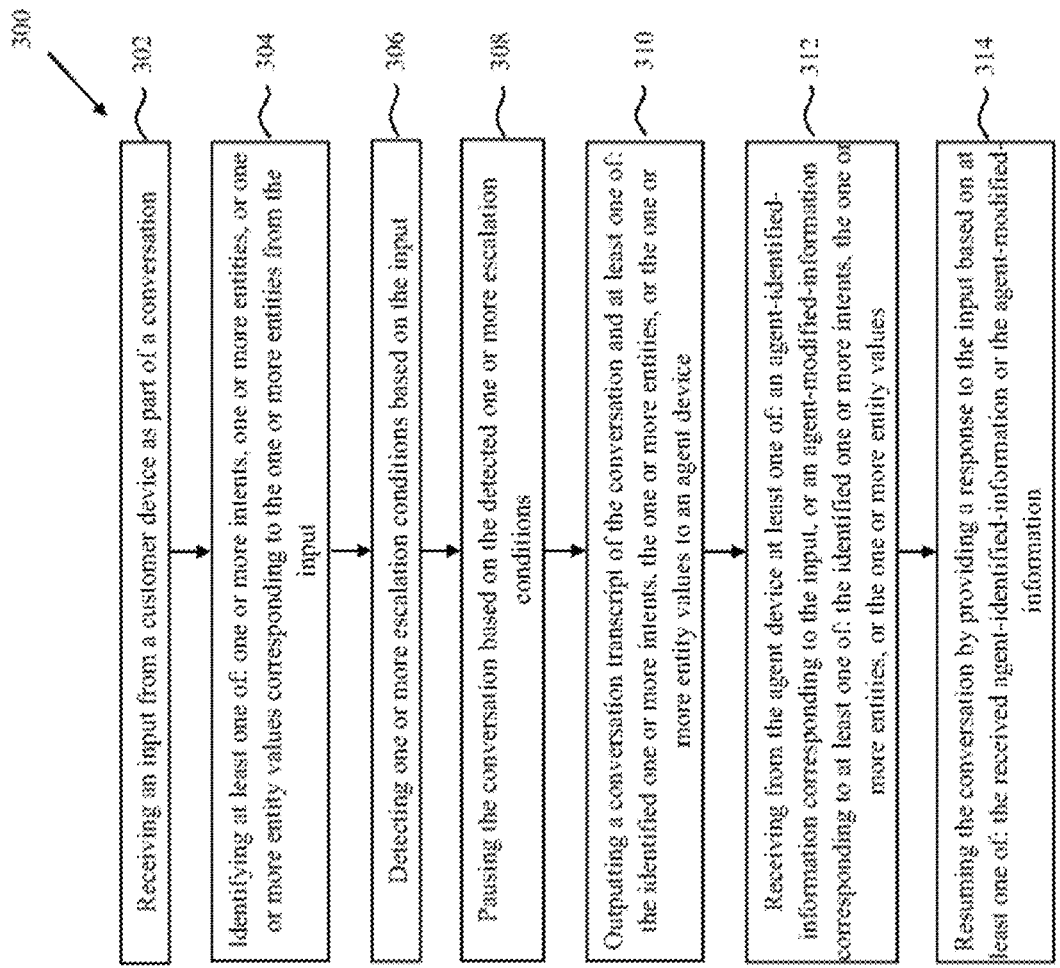
FIG. 3 is a flowchart of an exemplary method for handling customer conversations at a contact center server.

FIG. 3 illustrates a flowchart of an exemplary method 300 for handling customer conversations at the CCS 150 according to an example of the present disclosure. The exemplary method 300 comprises a human agent at one of the agent devices 130(1)-130(n) assisting the CCS 150 to handle a customer conversation. The method 300 may be performed by the system components illustrated in the environment 100 of FIG. 1.

At step 302, the CCS 150 may receive an input from a customer at one of the customer devices 110(1)-110(n) as part of a conversation. For example, the input from the customer at one of the customer devices 110(1)-110(n) may be a text input or a voice input. The customer at one of the customer devices 110(1)-110(n) may contact the CCS 150 via any of the plurality of communication channels 120(1)-120(n).

At step 304, the CCS 150 may identify at least one of: one or more intents, one or more entities, or one or more entity values corresponding to the one or more entities from the input. In an example, the CCS 150 uses the NLP engine 162 to interpret the input and identify at least one of: the one or more intents, the one or more entities, or the one or more entity values.

At step 306, the CCS 150 may detect one or more escalation conditions based on the input. The one or more escalation conditions may include, for example, an escalation intent in the input, receiving a threshold number of inputs (e.g., two consecutive inputs, or two out of the last three inputs) from the customer at one of the customer devices 110(1)-110(n) with a same intent, execution of a dialog flow of an intent reaching: a customer authentication node or a confirmation node in the dialog flow, detecting a negative sentiment in the input, account type of the customer, a customer preference in the input to communicate with the human agent, the customer input comprising negative words or phrases (e.g., no, wrong, incorrect, not correct, false), the CCS 150 unable to identify an intent from the input, frequency of inputs from one of the customer devices 110(1)-110(n) is greater than a threshold, a recent input from the customer device 110(n) is a repeat of an earlier input received from the customer device 110(n) during the ongoing conversation, the conversation between the customer at one of the customer devices 110(1)-110(n) and the CCS 150 continuing for a threshold amount of time (e.g., three minutes, five minutes), a number of error responses output by the CCS 150 to the customer at one of the customer devices 110(1)-110(n) is greater than a threshold, the customer at one of the customer devices 110(1)-110(n) providing corrections, or the customer at one of the customer devices 110(1)-110(n) providing digressions, although other types and/or numbers of escalation conditions may be defined in other configurations. In one example, the enterprise user may define one or more escalation conditions when a dialog flow is being configured and store them as part of the dialog flow configuration. In another example, the CCS 150 may determine one or more escalation conditions during run-time based on ongoing conversation between the customer at one of the customer devices 110(1)-110(n) and the CCS 150. Thus, if any of the customer inputs in the conversation triggers the one or more escalation conditions, then the CCS 150 may determine that the human agent intervention is required.

At step 308, the CCS 150 may pause the conversation based on the detected one or more escalation conditions. For example, when the input triggers the one or more escalation conditions, the CCS 150 understands that the human agent intervention is required in the conversation and pauses the conversation.

At step 310, the CCS 150 may output a conversation transcript of the conversation and at least one of: the identified one or more intents, the one or more entities, or the one or more entity values to one or more of agent devices 130(1)-130(n). In one example, the identified one or more intents, the one or more entities, or the one or more entity values may be output to one of the agent devices 130(1)-130(n) and displayed to the human agent in the agent device GUI 132.

FIGS. 4A-4D illustrate example wireframes of a conversation window 204 and a context form 214 displayed to the human agent at one of agent devices 130(1)-130(n) in the agent device GUI 132 in accordance with an example where the human agent at one of agent devices 130(1)-130(n)

identifies information from the input and adds the identified information to the context form 214.

Figure 4B:
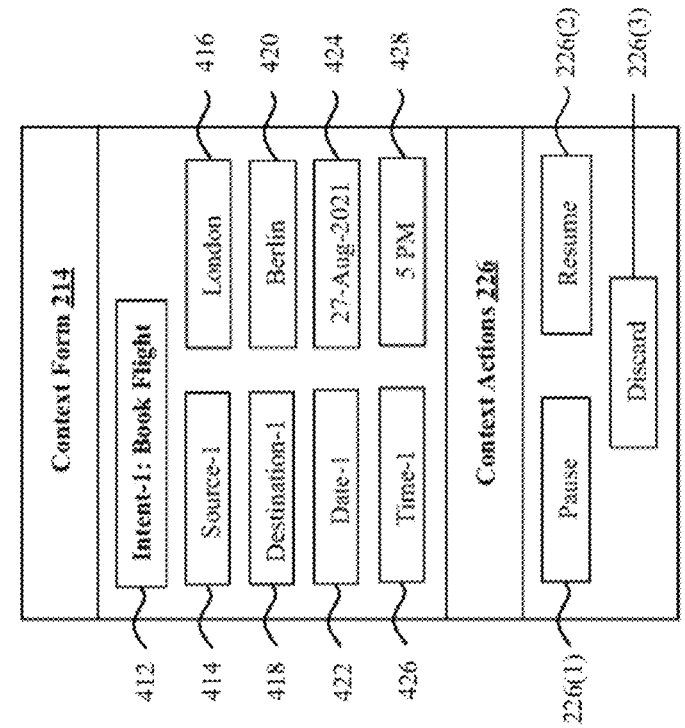
FIGS. 4A-4D are example wireframes of a conversation window and a context form displayed to the human agent in the graphical user interface in accordance with an example where the human agent is adding new information in the context form.
Figure 4A:
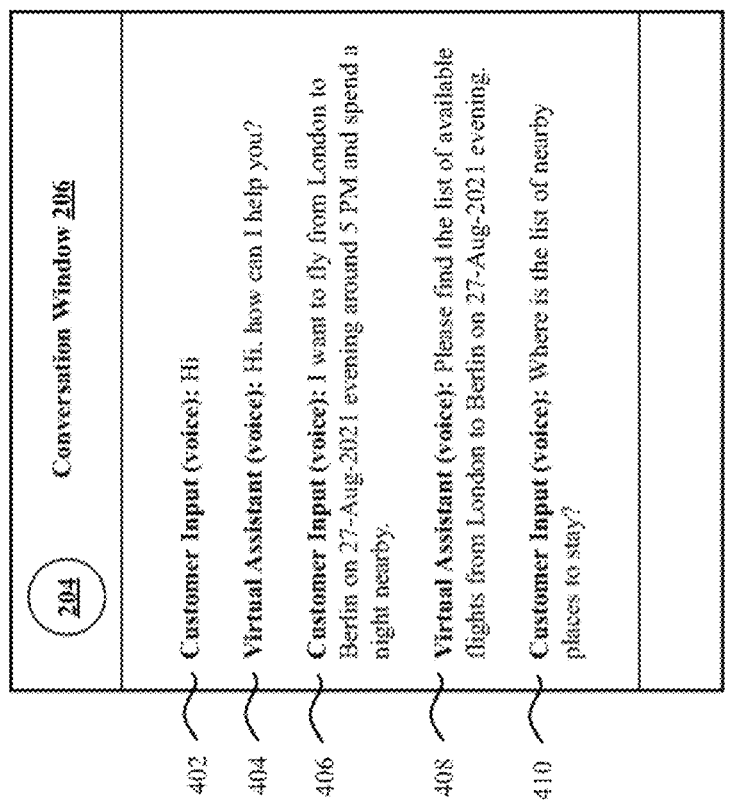

FIG. 4A illustrates an example wireframe of the conversation window 204 that may be displayed to the human agent at one of agent devices 130(1)-130(n) in the agent device GUI 132. In the conversation window 204, the human agent at one of agent devices 130(1)-130(n) may view the conversation transcript 402-410 of the conversation between the CCS 150 and the customer at one of the customer devices 110(1)-110(n). The customer at one of the customer devices 110(1)-110(n) provides an input 406—"I want to fly from London to Berlin on 27 Aug. 2021 evening around 5 PM and spend a night nearby.". The input 406 comprises two intents: (1) intent-1: "book flight" (entities—from London to Berlin on 27 Aug. 2021 around 5 PM), and (2) intent-2: "book hotel" (entity—in Berlin). For example, from the input 406, the CCS 150 may identify intent-1, and outputs a response 408—"Please find the list of available flights from London to Berlin on 27 Aug. 2021 evening" to the customer at one of the customer devices 110(1)-110(n). Following the response 408, the customer at one of the customer devices 110(1)-110(n) responds to the CCS 150 by providing an input 410—"Where is the list of nearby places to stay?". Based on the input 410, the CCS 150 may determine that one or more escalation conditions are triggered (i.e., the CCS 150 failed to identify an intent in the input, negative sentiment detected in the input) and human agent intervention is required in the conversation. Thus, when one or more escalation conditions are triggered, the CCS 150 may pause the conversation with the customer at one of the customer devices 110(1)-110(n), and outputs the conversation transcript and the identified intent-1, entities and entity values to one of the agent devices 130(1)-130(n) to be displayed to the human agent in the agent device GUI 132 in the context form 214 (as illustrated in FIG. 4B).

FIG. 4B illustrates an example wireframe of the context form 214 that is displayed in the agent device GUI 132 based on the input 406. As illustrated in FIG. 4B, the context form 214 may include:

1) identified intent-1: "book flight" 412 and a corresponding selection button 215(1);
2) identified entities: "source-1" 414, "destination-1" 418, "date-1" 422, "time-1" 426 corresponding to the intent-1: "book flight" 412;
3) identified entity values: "London" 416, "Berlin" 420, "27 Aug. 2021" 424, "5 PM" 428 corresponding to the entities: "source-1" 414, "destination-1" 418, "date-1" 422, "time-1" 426, respectively; and
4) context actions area 226 comprising context actions: pause 226(1), resume 226(2) and discard 226(3).

Referring back to FIG. 3, at step 312, the CCS 150 may receive from one of the agent devices 130(1)-130(n) at least one of: (a) an agent-identified-information corresponding to the input, or (b) an agent-modified-information corresponding to at least one of: the one or more intents, the one or more entities, or the one or more entity values that are identified by the CCS 150. The agent-identified-information may include at least one of: one or more new intents, one or more new entities corresponding to the one or more new intents, or one or more new entity values corresponding to the one or more new entities that are identified by the human agent from the input. The agent-modified-information may include modification information corresponding to at least one of: the one or more intents, the one or more entities, or the one or more entity values that are identified by the CCS 150 at step 304. For example, after the human agent at one of the agent devices 130(n)-130(n) adds new information to the context form 214 or modifies the information identified by the CCS 150 in the context form 214, the human agent at one of the agent devices 130(1)-130(n) selects the one or more intents 216(1)-216(n) using the one or more selection buttons 215(1)-215(n) and clicks the context action—resume 226(2).

In one example, the human agent at one of the agent devices 130(1)-130(n) may monitor the ongoing conversation between the CCS 150 and the customer at one of the customer devices 110(1)-110(n) and take over the conversation by pausing the conversation, using the context action—pause 226(1). In another example, the human agent at one of the agent devices 130(1)-130(n) may be involved in the conversation to assist the CCS 150 only when one or more escalation conditions are triggered (as discussed at step 306). In the example in which the human agent at one of the agent devices 130(1)-130(n) is assisting the CCS 150, the customer at one of the customer devices 110(1)-110(n) may or may not be aware of the human agent at one of the agent devices 130(n)-130(n) assisting the CCS 150.

From the conversation transcript (as illustrated in FIG. 4A) and the context form 214 (as illustrated in FIG. 4B) displayed in the agent device GUI 132, the human agent at one of the agent devices 130(1)-130(n) may determine that the CCS 150 is unable to identify the intent-2: "book hotel", from the input 406 and as a result, the customer at one of the customer devices 110(1)-110(n) responds by providing the input 410 having a negative sentiment. The human agent at one of the agent devices 130(1)-130(n) may identify the intent-2 from the conversation transcript and add the intent-2 to the context form 214, as illustrated in FIG. 4C.

Figure 4C:
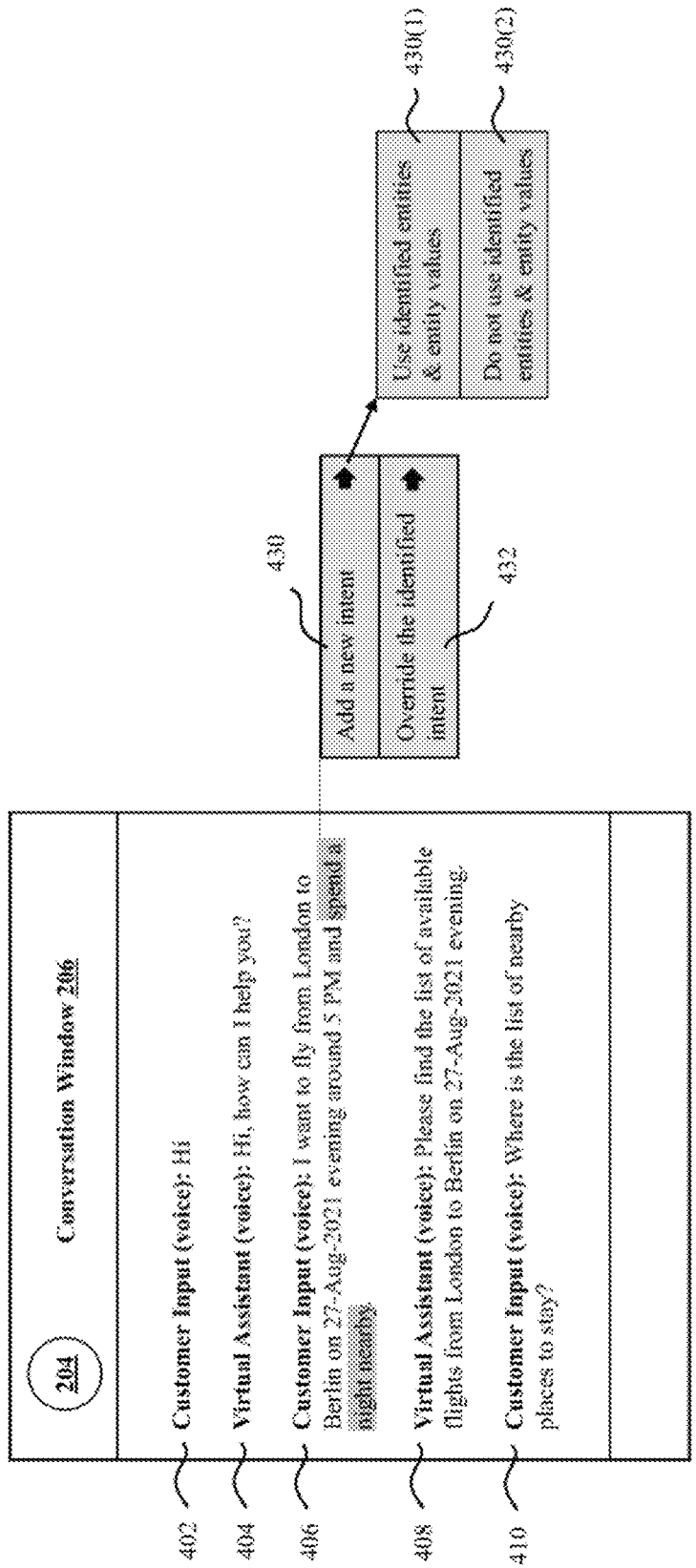

FIG. 4C illustrates an example wireframe of the conversation window 204 in which the human agent at one of the agent devices 130(1)-130(n) identifies the intent-2 from the conversation transcript and adds the intent-2 to the context form 214. For example, as illustrated in FIG. 4C, the human agent at one of the agent devices 130(1)-130(n) may determine from the conversation transcript that the CCS 150 failed to identify the intent of—"spend a night nearby". Subsequently, the human agent at one of the agent devices 130(1)-130(n) selects the phrase "spend a night nearby" in the conversation transcript and performs, for example, a right click action, which provides a first set of menu options "add a new intent" 430 and "override the identified intent" 432. When the human agent at one of the agent devices 130(1)-130(n) selects the menu option "add a new intent" 430, a second set of corresponding menu options "use identified entities & entity values" 430(1) and "do not use identified entities & entity values" 430(2) are displayed. In one example, when the human agent at one of the agent devices 130(1)-130(n) selects the menu option "use identified entities & entity values" 430(1), the CCS 150 checks if the identified one or more entities or one or more entity values may be mapped to the one or more entities or one or more entity values of the new intent being added to the context form 214. Upon successful mapping, the CCS 150 uses the identified one or more entities or one or more entity values for the new intent in the context form 214. On other hand, when the human agent at one of the agent devices 130(1)-130(n) selects the menu option "do not use identified entities & entity values" 430(2), the CCS 150 does not use the identified one or more entities and the corresponding entity values for the new intent being added to the context form 214, and instead the human agent at one of the agent devices 130(1)-130(n) may manually enter one or more new entities and corresponding entity values in the context form 214.

After the human agent at one of the agent devices 130(1)-130(n) selects the menu options "add a new intent" 430 and "do not use identified entities & entity values" 430(2) successively, a new intent is added to the context form 214. In one example, the human agent at one of the agent devices 130(1)-130(n) may select a text in the conversation transcript and add (e.g., type in) the new intent in the context form 214. In another example, after the human agent at one of the agent devices 130(1)-130(n) selects the new intent in the context form 214, a list of predefined intents may be displayed (e.g., as a dropdown list) for selection by the human agent at one of the agent devices 130(1)-130(n). In the example described in FIGS. 4A-4D, the human agent at one of the agent devices 130(1)-130(n) may select "book hotel" intent from the displayed list of predefined intents for the phrase "spend a night nearby". Further, after the human agent at one of the agent devices 130(1)-130(n) selects the "book hotel" intent from the list of predefined intents, the corresponding one or more entities may be presented to the human agent at one of the agent devices 130(1)-130(n) in the context form 214. Subsequently, the human agent at one of the agent devices 130(1)-130(n) may then manually select an entity type for each entity and enter entity values for each entity. In one example, the entities configured for the "book hotel" intent may be automatically populated by the CCS 150 and the human agent at one of the agent devices 130(1)-130(n) may manually enter the corresponding entity values in the context form 214.

Figure 4D:
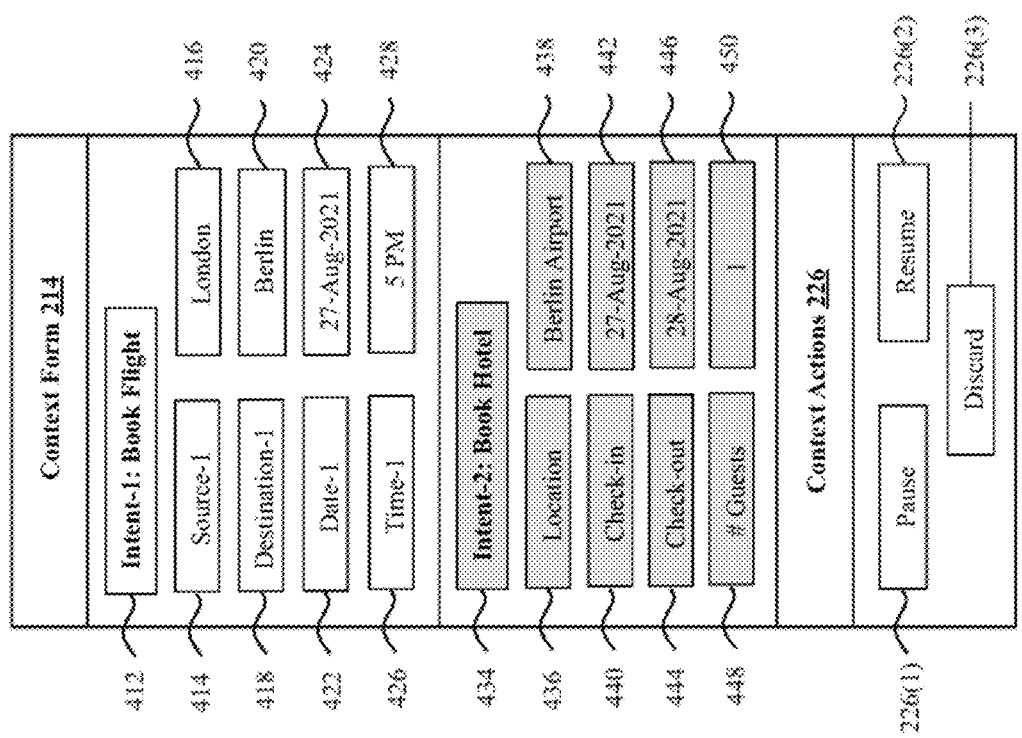

FIG. 4D illustrates an example wireframe of the context form 214 after the agent-identified-information is added to the context form 214. As illustrated in FIG. 4D, after the agent-identified-information is added, the context form 214 may include:

1) the previously identified information by the CCS 150 comprising:
   i) the intent-1: "book flight" 412 and the corresponding selection button 215(1);
   ii) the entities: "source-1" 414, "destination-1" 418, "date-1" 422, and "time-1" 426 corresponding to the intent-1: "book flight" 412;
   iii) the entity values: "London" 416, "Berlin" 420, "27 Aug. 2021" 424, and "5 PM" 428 corresponding to the entities: "source-1" 414, "destination-1" 418, "date-1" 422, and "time-1" 426, respectively; and
   iv) the context actions area 226 comprising the context actions: pause 226(1), resume 226(2), and discard 226(3); and
2) the agent-identified-information comprising:
   i) intent-2: "book hotel" 434 and a corresponding selection button 215(2);
   ii) entities: "location" 436, "check-in" 440, "check-out" 444, and "#guests" 448 (e.g., number of guests) corresponding to the intent-2: "book hotel" 434; and
   iii) entity values: "Berlin" 438, "27 Aug. 2021" 442, "28 Aug. 2021" 446, and "1" 450 corresponding to the entities: "location" 436, "check-in" 440, "check-out" 444, and "#guests" 448, respectively.

In one example, the agent-identified-information in the context form 214 may be highlighted (as illustrated in FIG. 4D) for easy reference to the human agent or other human agents at one or more of the agent devices 130(1)-130(n) of the contact center. In another example, when the human agent at one of the agent devices 130(1)-130(n) selects a portion of the conversation transcript and adds the selected portion as a new intent to the context form 214, the added new intent and the selected portion of the conversation transcript may be tagged and mapped to each other by the CCS 150. In another example, the CCS 150 may train artificial intelligence (AI) models such as, for example, one or more predictive models, one or more machine learning models, or one or more language models of the plurality of virtual assistants 164(1)-164(n) based on the agent-identified-information or agent-modified-information, although other types of models may be trained. In another example, the AI models may be trained using customer input and human agent response pairs. Based on the training the plurality of virtual assistants 164(1)-164(n) may automatically identify new intent(s), entities, or entity values, or alternative forms of intent(s), entities, or entity values that the customer at one of the customer devices 110(1)-110(n) may provide as the input during the conversation. In another example, after adding new information (e.g., one or more new intent(s), one or more new entity/entities) to the context form, the human agent at one of the agent devices 130(1)-130(n) may manually provide intent or entity training to the CCS 150 using the agent-identified-information. According to another example, the CCS 150 may tag and map the identified one or more intents, the one or more entities and the one or more entity values to the corresponding portions of the conversation transcript. Therefore, when the human agent at one of the agent devices 130(1)-130(n) selects any of the intents, the entities, or the entity values in the context form 214, the corresponding portion in the conversation transcript may be highlighted for easy reference to the human agent at one of the agent devices 130(1)-130(n).

Referring back to FIG. 3, at step 314, the CCS 150 may resume the conversation by providing a response to the input based on at least one of: the received agent-identified-information or the agent-modified-information in the context form 214. In one example, after the human agent adds the agent-identified-information—the intent-2: "book hotel" 434, the entities: 436, 440, 444, 448, and the entity values: 438, 442, 446, 450 to the context form 214 (as illustrated in FIG. 4D), the human agent selects the newly added intent-2: "book hotel" 434 using the corresponding selection button 215(2) and clicks on the context action—resume 226(2). Subsequently, the CCS 150 resumes the conversation with the customer at one of the customer devices 110(1)-110(n) by executing the selected intent-2: "book hotel" 434 and responds to the customer at one of the customer devices 110(1)-110(n) by outputting a list of hotels near Berlin airport based on the agent-identified-information—the intent-2: "book hotel" 434, the entities: 436, 440, 444, 448, and the entity values: 438, 442, 446, 450, as illustrated in FIG. 4D. In another example, the human agent at one of the agent devices 130(1)-130(n) may select the intent-1: "book flight" 412 and the intent-2: "book hotel" 434 using the selection buttons 215(1) and 215(2), respectively, and click the context action—resume 226(2). Subsequently, the CCS 150 resumes the conversation with the customer at one of the customer devices 110(1)-110(n) by executing the selected intent-1: "book flight" 412 and intent-2: "book hotel" 434 and accordingly responds to the customer at one of the customer devices 110(1)-110(n) by outputting a list of available flights and a list of available hotels. In one example, the CCS 150 may execute the one or more intents in an order specified by the human agent at one of the agent devices 130(1)-130(n), by way of example, the order in which the human agent at one of the agent devices 130(1)-130(n) selects the one or more intents in the context form 214 using the one or more selection buttons 215(1)-215(n). In another example, when the human agent at one of the agent devices 130(1)-130(n) directly clicks the context action—resume 226(2) without selecting the one or more selection buttons 215(1)-215(n), the CCS 150 may execute all the intents that are captured in the context form 214 that include at least one of: the one or more intents identified by the CCS 150, the one or more intents identified by the human agent at one of the agent devices 130(1)-130(n), or the one or more intents modified by the human agent at one of the agent devices 130(1)-130(n). Thus, using the context form 214, the human agent at one of the agent devices 130(1)-130(n) may assist the CCS 150 in handling the conversation with the customer at one of the customer devices 110(1)-110(n) in real-time.

Examples for Agent-Modified-Information

For further illustration, at step 312, the CCS 150 may receive from one of the agent devices 130(1)-130(n), the agent-modified-information. In one example, the human agent at one of the agent devices 130(1)-130(n) modifying the information identified by the CCS 150 in the context form 214 may be referred to as the agent-modified-information. The agent-modified-information may include modified information corresponding to at least one of: the one or more intents, the one or more entities, or the one or more entity values that are identified by the CCS 150. An example to illustrate the human agent at one of the agent devices 130(1)-130(n) modifying an intent identified by the CCS 150 is described below with respect to FIGS. 5A-5D.

FIGS. 5A-5D illustrate example wireframes of a conversation window 206 and a context form 214 displayed to the human agent at one of the agent devices 130(1)-130(n) in the agent device GUI 132 in accordance with an example where the human agent at one of the agent devices 130(1)-130(n) modifies an intent identified by the CCS 150 in the context form 214.

Figure 5B:
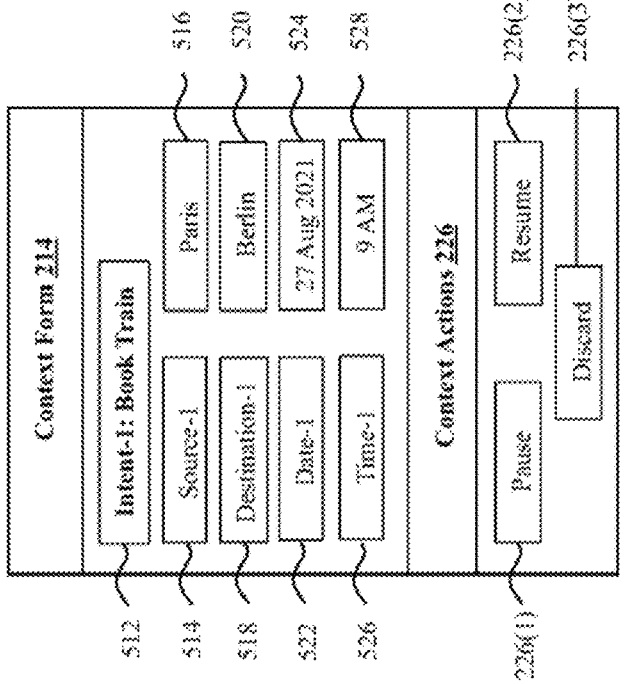
FIGS. 5A-5D are example wireframes of the conversation window and the context form displayed to the human agent in the graphical user interface in accordance with an example where the human agent is modifying identified intent(s) information in the context form.
Figure 5A:
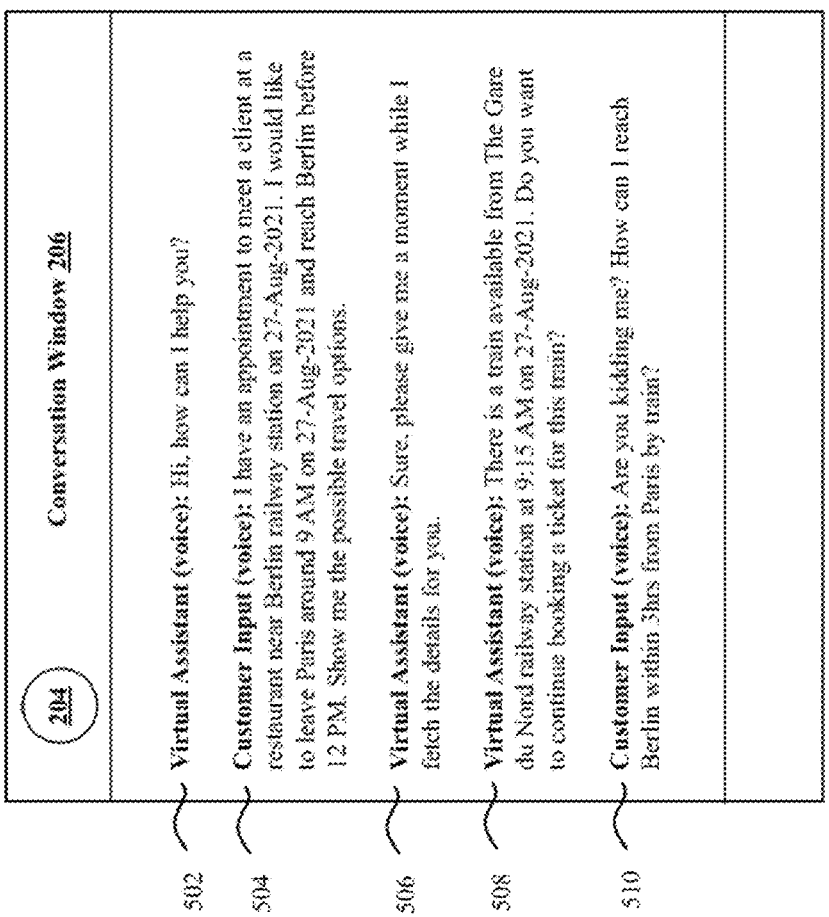

FIG. 5A illustrates an example wireframe of the conversation window 204 that is displayed in the agent device GUI 132 of one of the agent devices 130(1)-130(n). For example, the customer at one of the customer devices 110(1)-110(n) provides an input 504—"I have an appointment to meet a client at a restaurant near Berlin railway station on 27 Aug. 2021. I would like to leave Paris around 9 AM on 27 Aug. 2021 and reach Berlin before 12 PM. Show me the possible travel options". The input 504 comprises an intent "book flight" (e.g., which may be determined based on departure and arrival times provided in the input) from Paris to Berlin on 27 Aug. 2021 around 9 AM.

For example, from the input 504, the CCS 150 incorrectly identifies the customer intent as "book train" instead of "book flight" and outputs to the customer at one of the customer devices 110(1)-110(n) a response 508—"There is a train available from The Gare du Nord railway station at 9:15 AM on 27 Aug. 2021. Do you want to continue booking a ticket for this train?". Following the response 508, the customer at one of the customer devices 110(1)-110(n) responds to the CCS 150 by providing an input 510—"Are you kidding me? How can I reach Berlin within 3 hrs from Paris by train?". Based on the input 510, the CCS 150 determines that an escalation condition is triggered (i.e., anger detected in the customer input) and human agent intervention is required in the conversation. Thus, when the escalation condition is triggered, the CCS 150 may pause the conversation with the customer at one of the customer devices 110(1)-110(n) and output the conversation transcript and the identified information (e.g., one or more intent, one or more entities, one or more entity values) to one of the agent devices 130(1)-130(n) to be displayed to the human agent in the agent device GUI 132.

FIG. 5B illustrates an example wireframe of the context form 214 that is displayed to the human agent at one of the agent devices 130(1)-130(n) in the agent device GUI 132 based on the input 504. As illustrated in FIG. 5B, the context form 214 displayed to the human agent at one of the agent devices 130(1)-130(n) includes:
 1) identified intent-1: "book train" 512 and a corresponding selection button 215(1);
 2) identified entities: "source-1" 514, "destination-1" 518, "date-1" 522, "time-1" 526 corresponding to the intent-1: "book train" 512;
 3) identified entity values: "Paris" 516, "Berlin" 520, "27 Aug. 2021" 524, "9 AM" 528 corresponding to the entities: "source-1" 514, "destination-1" 518, "date-1" 522, "time-1" 526, respectively; and
 4) context actions area 226 comprising context actions: pause 226(1), resume 226(2), and discard 226(3).

For example, from the conversation transcript (as illustrated in FIG. 5A) and the context form 214 (as illustrated in FIG. 5B) that are displayed in the agent device GUI 132, the human agent at one of the agent devices 130(1)-130(n) determines that the CCS 150 incorrectly identified the intent of the input 504 and as a result the customer at one of the customer devices 110(1)-110(n) expressed anger in the input 510. Thus, the human agent at one of the agent devices 130(1)-130(n) may modify the identified intent in the context form 214 based on the conversation transcript, as illustrated in FIG. 5C.

Figure 5C:
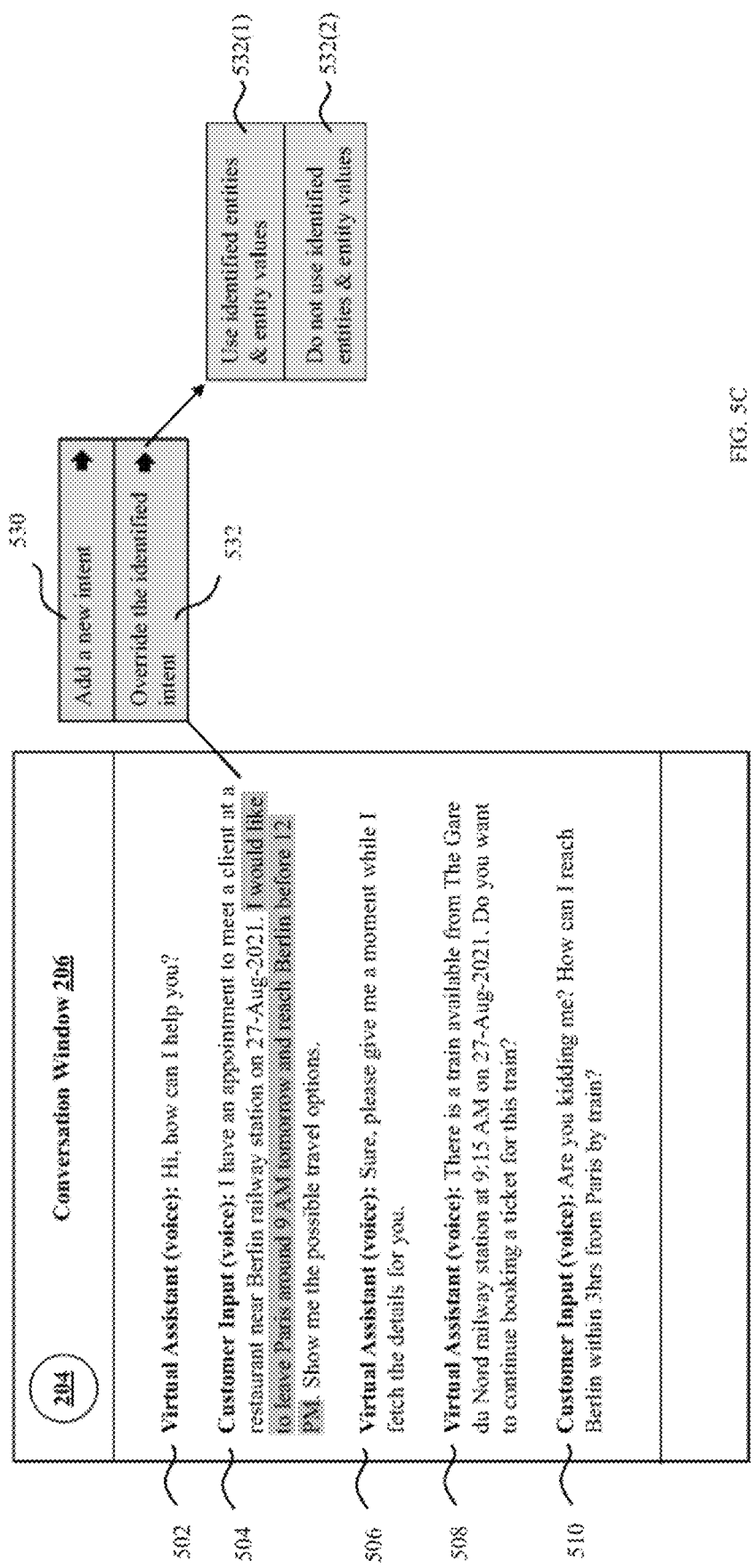

FIG. 5C illustrates an example wireframe of the conversation window 204 which the human agent at one of the agent devices 130(1)-130(n) uses to modify the incorrect intent identified by the CCS 150. For example, as illustrated in FIG. 5C, the human agent at one of the agent devices 130(1)-130(n) selects the sentence—"I would like to leave Paris around 9 AM on 27 Aug. 2021 and reach Berlin before 12 PM" in the input 504 of the conversation transcript and performs, for example, a right click action that provides a first set of menu options "add a new intent" 530 and "override the identified intent" 532. When the human agent at one of the agent devices 130(1)-130(n) selects the menu option "override the identified intent" 532, a second set of corresponding menu options "use identified entities & entity values" 532(1) and "do not use identified entities & entity values" 532(2) are displayed. In one example, when the human agent at one of the agent devices 130(1)-130(n) selects the menu option "use identified entities & entity values" 532(1), the CCS 150 checks if the identified one or more entities or one or more entity values may be mapped to the one or more entities or one or more entity values of the intent being modified in the context form 214. Upon successful mapping, the CCS 150 uses the identified one or more entities or one or more entity values for the modified intent. On the other hand, when the human agent at one of the agent devices 130(1)-130(n) selects the menu option "do not use identified entities & entity values" 532(2), the CCS 150 does not use the identified one or more entities and corresponding entity values for the intent being modified in the context form 214 and instead the human agent at one of the agent devices 130(1)-130(n) may manually enter one or more entities and corresponding entity values in the context form 214. In one example, the human agent at one of the agent devices 130(1)-130(n) may select the intent-1: "book train" 512 in the context form 214 and manually modify the intent "book train" to "book flight", as illustrated in FIG. 5D.

Figure 5D:
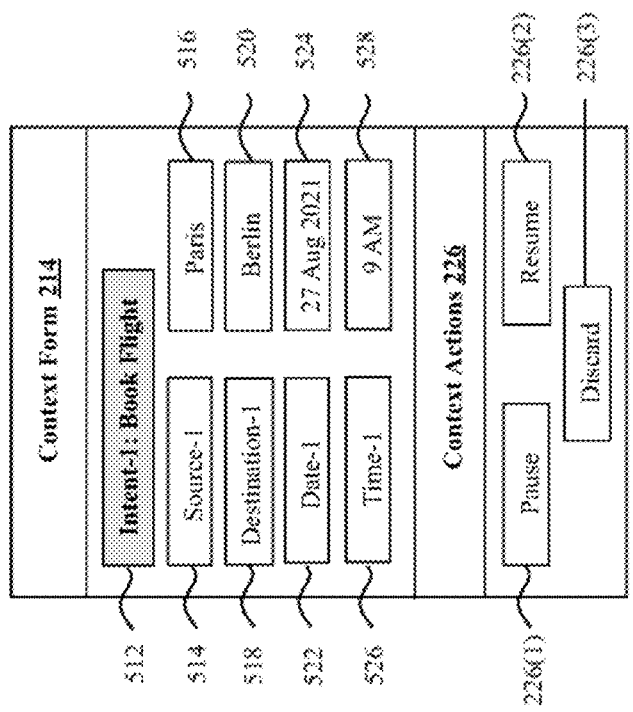

FIG. 5D illustrates an example wireframe of the context form 214 modified by the human agent at one of the agent devices 130(1)-130(n). As illustrated in FIG. 5D, after modification by the human agent at one of the agent devices 130(1)-130(n), the context form 214 may include:
1) the modified intent-1: "book flight" 512 and the corresponding selection button 215(1); and
2) the previously identified information by the CCS 150 comprising:
   i) the entities: "source-1" 514, "destination-1" 518, "date-1" 522, "time-1" 526 corresponding to the intent-1: "book flight" 512; and
   ii) the entity values: "Paris" 516, "Berlin" 520, "27 Aug. 2021" 524, "9 AM" 528 corresponding to the entities: "source-1" 514, "destination-1" 518, "date-1" 522, "time-1" 526, respectively; and
   iii) the context actions area 226 comprising the context actions: pause 226(1), resume 226(2), and discard 226(3).

For example, after the human agent at one of the agent devices 130(1)-130(n) manually modifies the intent "book train" to "book flight", as illustrated in FIG. 5D, the human agent at one of the agent devices 130(1)-130(n) may select the intent-1: "book flight" 512 using the selection button 215(1) and click the context action—resume 226(2). Subsequently, the CCS 150 resumes the conversation with the customer at one of the customer devices 110(1)-110(n) by executing the selected intent-1: "book flight" 512 and outputs a list of available flights based on the entities: 514, 518, 522, 526, and the entity values 516, 520, 524, 528, as illustrated in FIG. 5D.

In one example, the agent-modified-information in the context form 214 may be highlighted (as illustrated in FIG. 5D at 512) for easy reference to the human agent or other human agents at one or more of the agent devices 130(1)-130(n) of the contact center. In another example, when the human agent at one of the agent devices 130(1)-130(n) modifies at least one of: the identified one or more intents, the one or more entities, or the one or more entity values in the context form 214, the previous tagging and mapping performed by the CCS 150 between the identified one or more intents, the one or more entities or the one or more entity values, and the conversation transcript, may be modified accordingly.

Further, an example to illustrate the human agent at one of the agent devices 130(1)-130(n) modifying the one or more entities or the one or more entity values identified by the CCS 150 is described below with respect to FIGS. 6A-6C.

Figure 6C:
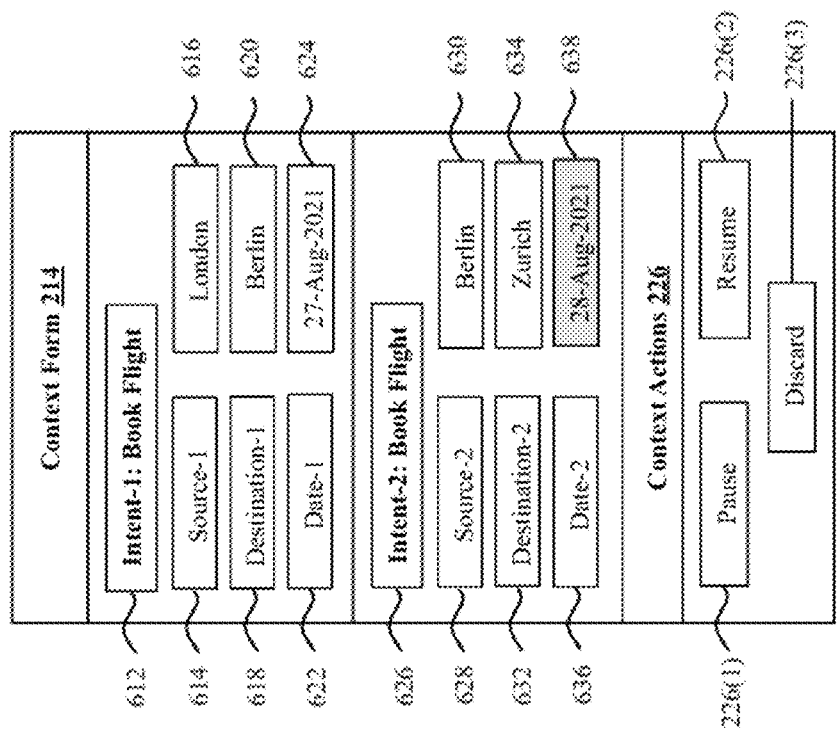

FIGS. 6A-6C illustrate example wireframes of a conversation window 206 and a context form 214 displayed to the human agent at one of the agent devices 130(1)-130(n) in the agent device GUI 132, in accordance with an example where the human agent at one of the agent devices 130(1)-130(n) may modify the identified one or more entities or the one or more entity values in the context form 214.

FIG. 6A illustrates an example wireframe of the conversation window 204 that is displayed to the human agent at one of the agent devices 130(1)-130(n) in the agent device GUI 132. For example, the customer at one of the customer devices 110(1)-110(n) provides an input 604—"I want to fly from London to Berlin on 27 Aug. 2021, spend a night there and take the next available flight to Zurich". The input 604 comprises an intent "book flight" from London to Berlin on 27 Aug. 2021 and from Berlin to Zurich on 28 Aug. 2021.

For example, from the input 604, the CCS 150 incorrectly identifies one of the entity values and outputs to the customer at one of the customer devices 110(1)-110(n) a response 608—"Please confirm that you are looking to book flights from London to Berlin and Berlin to Zurich on 27 Aug. 2021?". Following the response 608, the customer at one of the customer devices 110(1)-110(n) responds to the CCS 150 by providing an input 610—"No. That is not correct.". Based on the input 610, the CCS 150 determines that an escalation condition is triggered (i.e., the customer input includes negative words or phrases such as "no" and "not correct") and human agent intervention is required in the conversation. In one example, when the customer at one of the customer devices 110(1)-110(n) provides the input including words such as, for example, "no", "wrong", "incorrect", "false", etc., the conversation may be referred to the human agent at one of the agent devices 130(1)-130(n) for monitoring or assisting the CCS 150. Thus, when the escalation condition is triggered, the CCS 150 may pause the conversation with the customer at one of the customer devices 110(1)-110(n) and output the conversation transcript and the identified information (e.g., one or more intents, one or more entities, one or more entity values) to one of the agent devices 130(1)-130(n) to be displayed to the human agent in the agent device GUI 132.

FIG. 6B illustrates an example wireframe of the context form 214 that is displayed to the human agent at one of the agent devices 130(1)-130(n) in the agent device GUI 132 based on the input 604. As illustrated in FIG. 6B, the context form 214 displayed to the human agent at one of the agent devices 130(1)-130(n) in the agent device GUI 132 may include:
1) identified intent-1: "book flight" 612 and a corresponding selection button 215(1);
2) identified entities: "source-1" 614, "destination-1" 618, "date-1" 622 corresponding to the intent-1: "book flight" 612;
3) identified entity values: "London" 616, "Berlin" 620, "27 Aug. 2021" 624 corresponding to the entities: "source-1" 614, "destination-1" 618, "date-1" 622, respectively;
4) identified intent-2: "book flight" 626 and a corresponding selection button 215(2);
5) identified entities: "source-2" 628, "destination-2" 632, "date-2" 636 corresponding to the intent-2: "book flight" 626;
6) identified entity values: "Berlin" 630, "Zurich" 634, "27 Aug. 2021" 638 corresponding to the entities: "source-2" 628, "destination-2" 632, "date-2" 636, respectively; and
7) context actions area 226 comprising context actions: pause 226(1), resume 226(2), and discard 226(3).

For example, from the conversation transcript (as illustrated in FIG. 6A) and the context form 214 (as illustrated in FIG. 6B) displayed in the agent device GUI 132, the human agent at one of the agent devices 130(1)-130(n) identifies that the CCS 150 incorrectly identified an entity value from the input 604 and as a result the customer at one of the customer devices 110(1)-110(n) expressed negative words or phrases in the input 610. Thus, the human agent at one of the agent devices 130(1)-130(n) may modify the identified entity value in the context form 214 based on the conversation transcript, as described below with reference to FIG. 6C.

FIG. 6C illustrates an example wireframe of the context form 214 modified by the human agent at one of the agent devices 130(1)-130(n). As illustrated in FIG. 6C, after modification by the human agent at one of the agent devices 130(1)-130(n), the context form 214 may include:
1) the previously identified information by the CCS 150 comprising:

i) the intent-1: "book flight" 612, the intent-2: "book flight" 626, and the corresponding selection buttons 215(1) and 215(2);

ii) the entities: "source-1" 614, "destination-1" 618, "date-1" 622 corresponding to the intent-1: "book flight" 612;

iii) the entity values: "London" 616, "Berlin" 620, "27 Aug. 2021" 624 corresponding to the entities: "source-1" 614, "destination-1" 618, "date-1" 622, respectively;

iv) the entities: "source-2" 628, "destination-2" 632, "date-2" 636 corresponding to the intent-2: "book flight" 626;

v) the entity values: "Berlin" 630, "Zurich" 634 corresponding to the entities: "source-2" 628, "destination-2" 632, respectively; and vi) the context actions area 226 comprising the context actions: pause 226(1), resume 226(2), and discard 226(3); and 2) the human agent at one of the agent devices 130(1)-130(n) modified entity value "28 Aug. 2021" 638 corresponding to the entity "date-2" 636.

For example, after the human agent at one of the agent devices 130(1)-130(n) manually modifies the entity value 638 from "27 Aug. 2021" to "28 Aug. 2021", as illustrated in FIG. 6C, the human agent at one of the agent devices 130(1)-130(n) may select the intent-1: "book flight" 612 and the intent-2: "book flight" 626 using the corresponding selection buttons 215(1), 215(2), and click the context action—resume 226(2). Subsequently, the CCS 150 resumes the conversation with the customer at one of the customer devices 110(1)-110(n) by executing the selected intent-1: "book flight" 612 and intent-2: "book flight" 626. The CCS 150 outputs a first list of available flights based on the entities: 614, 618, 622, and the entity values: 616, 620, 624, and a second list of available flights based on the entities: 628, 632, 636, and the entity values: 630, 634, 638, as illustrated in FIG. 6C.

In one example, the agent-modified-information in the context form 214 may be highlighted (as illustrated at 638 in FIG. 6C) for easy reference to the human agent or other human agents at one or more of the agent devices 130(1)-130(n) of the contact center. In another example, after modifying the CCS 150 identified information (e.g., one or more intents, one or more entities) in the context form 214, the human agent at one of the agent devices 130(1)-130(n) may manually provide intent or entity training to the CCS 150 using the agent-modified-information.

Therefore, in accordance with the examples described above, the context form 214 and the conversation transcript may enable the human agent at one of the agent devices 130(1)-130(n) to quickly perform, for example, one or more of: (1) identifying the intent(s) or sub-intent(s) of the customer at one of the customer devices 110(1)-110(n), (2) identifying the incorrectly identified information by the CCS 150 and modifying the incorrectly identified information in the context form 214, (3) identifying the information that the CCS 150 failed to capture and adding the identified information to the context form 214, or the like. Also, the context actions 226 may enable the human agent at one of the agent devices 130(1)-130(n) to modify the execution of the conversation with the customer at one of the customer devices 110(1)-110(n) at any stage of the conversation. Thus, as discussed, the human agent at one of the agent devices 130(1)-130(n) may assist the CCS 150, in real-time, using the context form 214 and the conversation transcript.

Figure 7A:
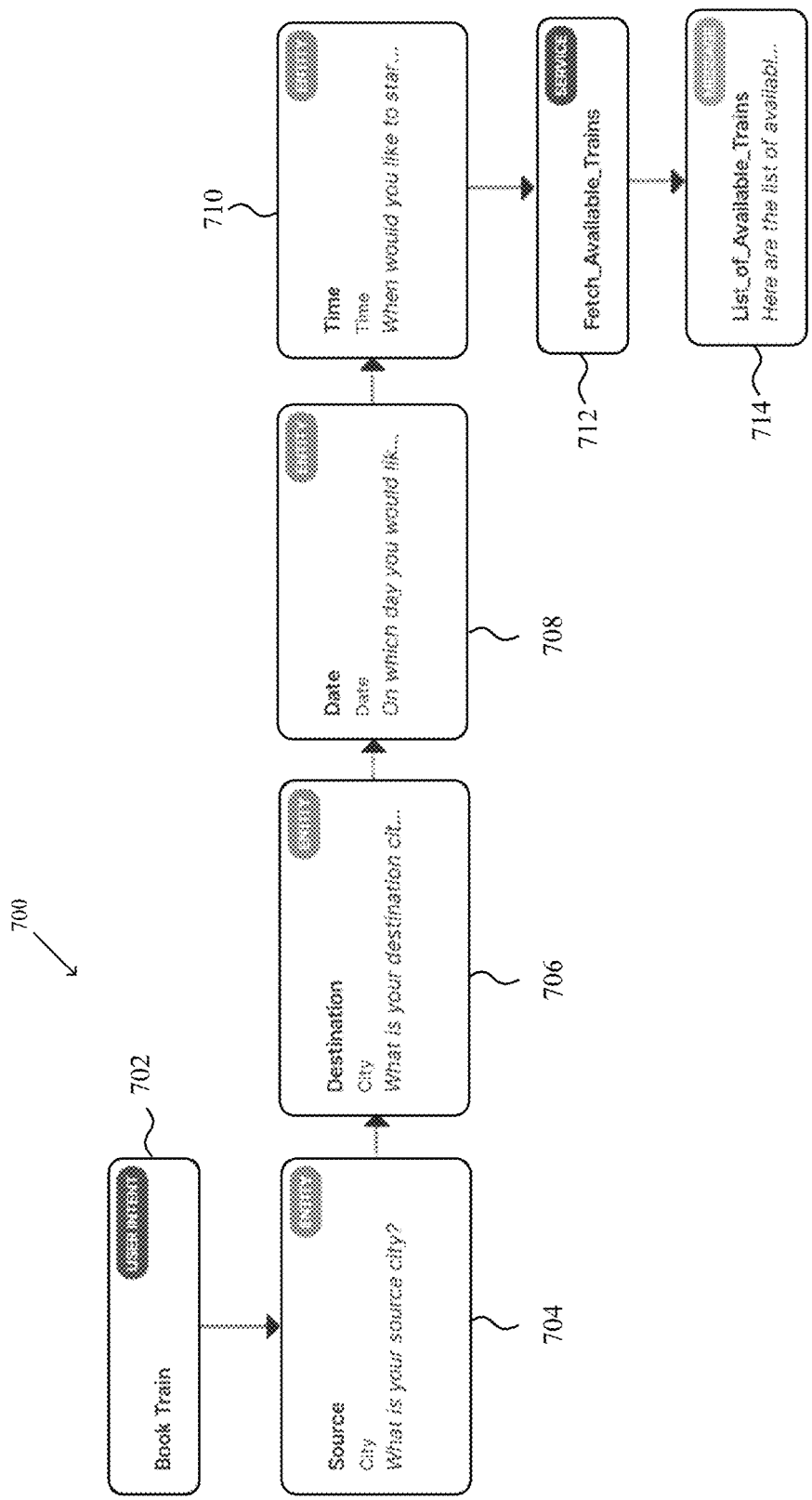
FIGS. 7A-7B are example screenshots of dialog flows configured for two different intents.
Figure 7B:
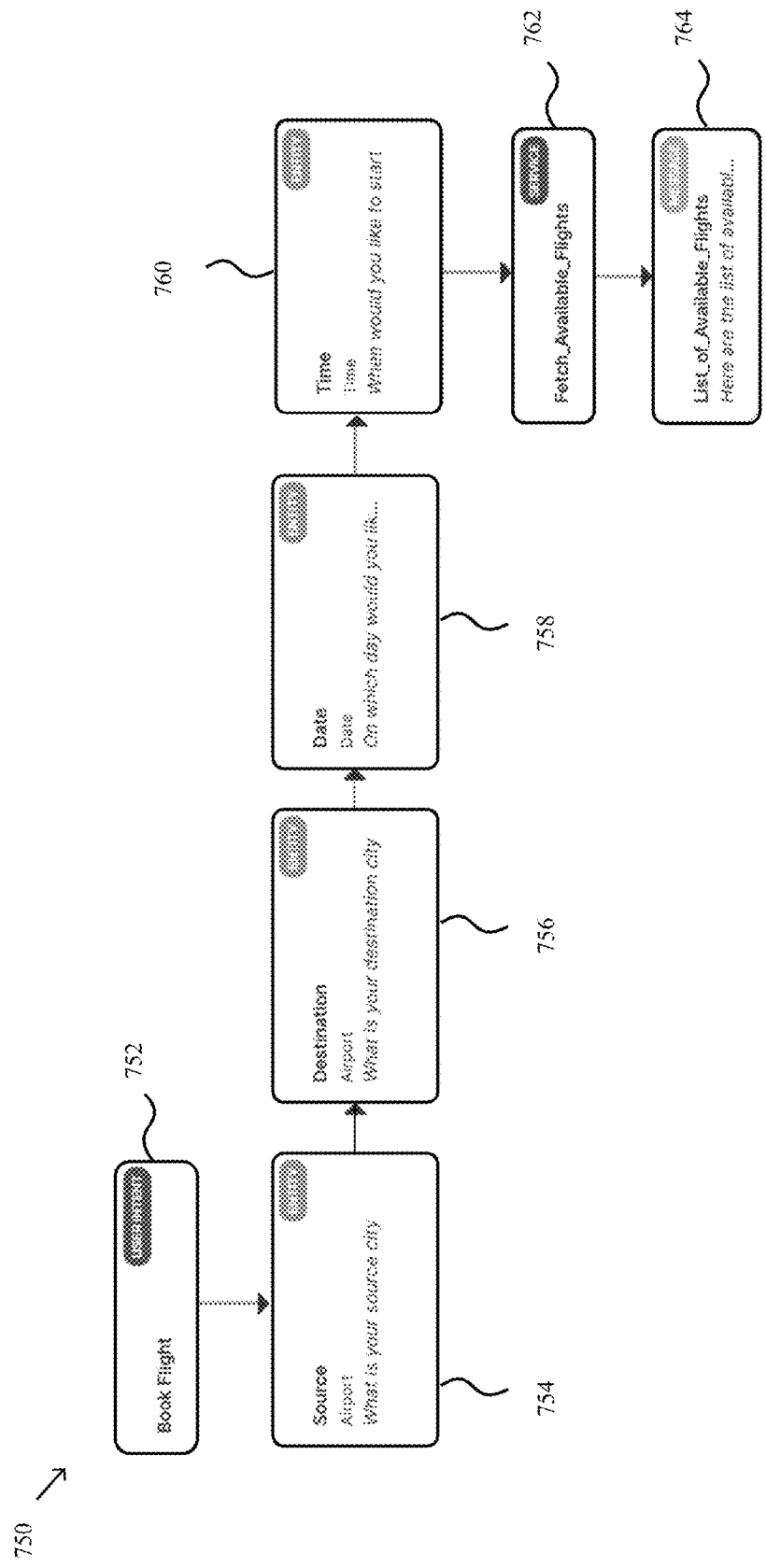

FIGS. 7A and 7B illustrate screenshots of example dialog flows of two different intents. Execution of a dialog flow by the CCS 150 enables the CCS 150 to respond to customer inputs. The dialog flow includes a network of nodes and branch paths that may be connected using conditions. In one example, a dialog flow may be configured to handle a single intent or multiple intents within a single conversation. The enterprise user may create the dialog flows using a dialog builder tool provided by the CCS 150. FIG. 7A illustrates a screenshot of an example dialog flow of "book train" intent 700, and FIG. 7B illustrates a screenshot of an example dialog flow of "book flight" intent 750.

As illustrated in FIG. 7A, the dialog flow of "book train" intent 700 includes a plurality of nodes such as, for example, an intent node—book train 702, an entity node—source 704, an entity node—destination 706, an entity node—date 708, an entity node—time 710, a service node—fetch_available_ trains 712, and a message node—list_of_available_trains 714, although other types and/or numbers of nodes or branch paths may be included in other configurations. The intent node—book train 702 includes configuration and training data provided by the enterprise user to enable the CCS 150 to determine if the intent of a customer's input is "book train". The training data may include patterns, rules, synonyms, or training utterances that trigger the "book train" intent. Example training utterances may be—"book train", "book a train ticket", "show available trains", "find the nearest railway station", "what are the train timings?", or the like. Also, as part of the training, the enterprise user may provide training data related to entities. For example, for the "book train" intent, the entity training data may include synonyms of source 704 such as "departure city", depart, "leave from", or the like. Further, as part of the training data, the enterprise user may create patterns and rules to identify the intent of the customer input. Based on the training, the CCS 150 may determine if the customer input matches the "book train" intent and upon a match executes the dialog flow of "book train" intent.

The configuration of each entity node: 704, 706, 708 and 710 comprises an entity and entity type that are required to fulfill the "book train" intent 700. For example, the entities required to fulfill the "book train" intent 700 may be source 704, destination 706, date 708 and time 710. The entity nodes corresponding to source 704 and destination 706 may be of entity type, for example, railway station, city, town, place, or the like. The entity nodes corresponding to date 708 and time 710 may be of entity type "date-time" that accept date and/or time. The service node—fetch_available_trains 712 may be configured to communicate with an internal repository maintained by the CCS 150 or an external service to fetch required information. In one example, the CCS 150 may configure an API call made by the service node— fetch_available_trains 712 to the internal repository or the external service (e.g., a travel website) to fetch information about available trains between the source and the destination on a given date and time. The message node—list_of_available_trains 714 is configured to output fetched information about available trains to the customer at one of the customer devices 110(1)-110(n).

As illustrated in FIG. 7B, the dialog flow of "book flight" intent 750 includes a plurality of nodes such as, for example, an intent node—book flight 752, an entity node—source 754, an entity node—destination 756, an entity node—date 758, an entity node—time 760, a service node—fetch_available_flights 762, and a message node—list_of_available_ flights 764, although other types and/or numbers of nodes or branch paths may be included in other configurations. The intent node—book flight 752 includes configuration and training data provided by the enterprise user to enable the CCS 150 to determine if the intent of a customer input is "book flight". The training data may include patterns, rules, synonyms, or training utterances that trigger the "book flight" intent such as—"book flight", "book a flight ticket", "show available flights", "find the nearest airport", "what are the flight timings?", "I want to fly from . . . ", "I want to fly to . . . ", or the like. Also, as part of the training, the enterprise user provides training data related to entities. For example, for the "book flight" intent, the entity training data may include synonyms of source 754 such as "departure city", depart, "leave from", or the like. Further, as part of the training data, the enterprise user may create patterns and rules to optimize the accuracy and recognition of the NLP engine 162. Based on the training, the CCS 150 may determine if a customer input matches the "book flight" intent and upon a match executes the dialog flow of "book flight" intent.

The configuration of each entity node: 754, 756, 758 and 760 comprises an entity and entity type that are required to fulfill the "book flight" intent 750. For example, the entities required to fulfill the "book flight" intent 750 may be source 754, destination 756, date 758 and time 760. The entity nodes corresponding to source 754 and destination 756 may be of entity type, for example, airport, country, city, or the like. The entity nodes corresponding to date 758 and time 760 may be of entity type "date-time" that accept date and/or time. The service node—fetch_available_flights 762 may be configured to communicate with an internal repository maintained by the CCS 150 or an external service to fetch required information. In one example, the CCS 150 may configure an API call made by the service node—fetch_available_flights 762 to the internal repository or the external service (e.g., the travel website) to fetch information about available flights between the source and the destination on a given date and time. The message node—list_of_available_flights 764 is configured to output fetched information about available flights to the customer at one of the customer devices 110(1)-110(n).

The example discussed in FIGS. 5A-5D (i.e., the human agent at one of the agent devices 130(1)-130(n) modifying the identified intent in the context form 214), will be further illustrated with respect to FIGS. 7A and 7B. As discussed previously with respect to FIGS. 5A and 5B, based on the input 504 provided by the customer at one of the customer devices 110(1)-110(n), the intent identified by the CCS 150 (i.e., intent-1: "book train" 512) is incorrect and the incorrectly identified intent by the CCS 150 is displayed to the human agent at one of the agent devices 130(1)-130(n) in the context form 214 in the agent device GUI 132. However, the entities—514, 518, 522, 526 and the corresponding entity values—516, 520, 524, 528 are identified correctly by the CCS 150 from the input 504. Based on the identified intent, the CCS 150 executes the dialog flow of "book train" intent 700. The identified entity values—516, 520, 524, 528 may be stored using variables corresponding to the entity nodes—704, 706, 708 and 710 in a session context created by the CCS 150 for the conversation.

After the identified entity values—516, 520, 524, 528 are stored, the service node—fetch_available_trains 712 is executed by the CCS 150 by configuring the API call to the internal repository or the external service (e.g., the travel website) to fetch information about available trains between source city "Paris" 516 and destination city "Berlin" 520 on 27 Aug. 2021 at 9 AM. Further, after the information about the available trains is fetched, the CCS 150 executes the message node—list_of_available_trains 714 to output the fetched information about the available trains to the customer at one of the customer devices 110(1)-110(n), for example, as illustrated in FIG. 5A at 508—"There is a train available from The Gare du Nord railway station at 9:15 AM on 27 Aug. 2021. Do you want to continue booking a ticket for this train?". As the customer at one of the customer devices 110(1)-110(n) is expecting a list of available flights as the response to the input 504, the customer at one of the customer devices 110(1)-110(n) expresses anger in the input 510, as illustrated in FIG. 5A.

Determining that the CCS 150 identified an incorrect intent, the human agent at one of the agent devices 130(1)-130(n) modifies the intent 512 to "book flight" from "book train" in the context form 214, as illustrated in FIG. 5D. Based on the modified intent 512, the CCS 150 executes the dialog flow of "book flight" intent 750. In one example, as illustrated in FIG. 5C, when the human agent at one of the agent devices 130(1)-130(n) selects the menu options "override the identified intent" 532 and "use identified entities & entity values" 532(1), the CCS 150 executes the dialog flow of "book flight" intent 750 by using the previously identified entity values—516, 520, 524, 528 for the entity nodes—754, 756, 758 and 760. As the session context comprises previously identified entity values—516, 520, 524, 528, the CCS 150 executes the service node—fetch_available_flights 762 in the dialog flow of the "book flight" intent 750. Further, the CCS 150 configures the API call to the internal repository or the external service (e.g., the travel website) to fetch information about available flights between the source city "Paris" 516 and the destination city "Berlin" 520 on "27 Aug. 2021" 524 at "9 AM" 528. Furthermore, after the information about available flights is fetched, the CCS 150 executes the message node—list_of_available_flights 764 to output the fetched information about available flights to the customer at one of the customer devices 110(1)-110(n).

In another example, when the human agent at one of the agent devices 130(1)-130(n) selects the menu options "override the identified intent" 532 and "do not use identified entities & entity values" 532(2), the CCS 150 executes the dialog flow of the "book flight" intent 750. In this case, the CCS 150 starts the execution at the entity node—source 754 in the dialog flow of "book flight" intent 750. Thus, the CCS 150 may switch between different dialog flows based on the modifications made by the human agent at one of the agent devices 130(1)-130(n) in the context form 214, in real-time.

Figure 8:
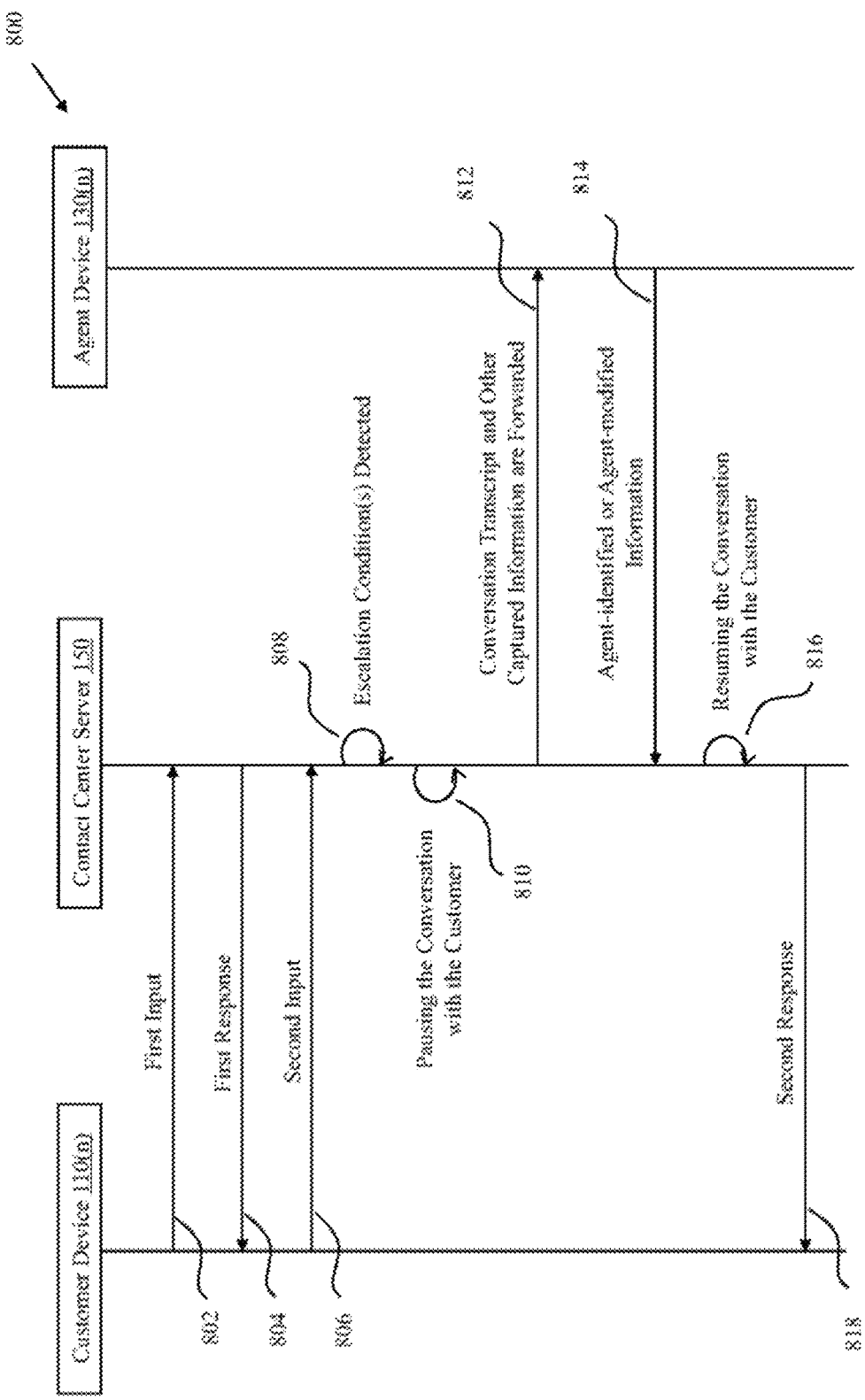
FIG. 8 is a sequence diagram illustrating an exemplary method for handling a customer conversation at the contact center server.

FIG. 8 is a sequence diagram illustrating an exemplary method for handling a customer conversation at the CCS 150. In one example, the conversation may be a text-based conversation or a voice-based conversation. It may be understood that FIG. 8 depicts a few steps involved in a conversation (between the customer at one of the customer devices 110(1)-110(n), the CCS 150 and the human agent at one of the agent devices 130(1)-130(n), in this example), and other types and/or numbers of steps may be performed in other configurations. Further, it may be understood that the steps shown and described do not have to take place in the sequence shown.

In the illustrated example in FIG. 8, a conversation is already underway between the customer at one of the customer devices 110(1)-110(n) and the CCS 150. At step 802, the customer at one of the customer devices 110(1)-110(n) transmits a first input composed by the customer to the CCS 150. The CCS 150 receives the first input and interprets the first input utilizing natural language processing techniques, and identifies one or more intents, one or more entities, or one or more entity values. At step 804, the CCS 150 executes a dialog flow of an identified intent and generates and outputs a first response to the customer at one of the customer devices 110(1)-110(n). At this point, the conversation may continue, and either the customer at one of the customer devices 110(1)-110(n) or the CCS 150 may cause a next message to be sent as part of the conversation. In the illustrated example, at step 806, the flow continues with a second input sent from the customer at one of the customer devices 110(1)-110(n) to the CCS 150.

At step 808, the CCS 150 interprets the second input and detects if one or more escalation conditions are triggered. At step 810, the CCS 150 may pause the ongoing conversation with the customer at one of the customer devices 110(1)-110(n) after detecting the one or more escalation conditions. At step 812, the CCS 150 forwards the identified information from the customer input (i.e., one or more intents, one or more entities, and one or more entity values), and a conversation transcript of the conversation between the customer at one of the customer devices 110(1)-110(n) and the CCS 150, to a human agent at one of the agent devices 130(1)-130(n). The human agent at one of the agent devices 130(1)-130(n) may read-through the conversation transcript and verify the identified information received from the CCS 150.

At step 814, the CCS 150 may receive at least one of: agent-identified-information or agent-modified-information from one of the agent devices 130(1)-130(n). For example, after the human agent at one of the agent devices 130(1)-130(n) adds new information to the context form 214 or modifies the information identified by the CCS 150 in the context form 214, the human agent at one of the agent devices 130(1)-130(n) may select one or more intents using the one or more selection buttons 215(1)-215(n) and click the context action—resume 226(2). Subsequently, at step 816, the CCS 150 resumes the conversation with the customer at one of the customer devices 110(1)-110(n) by executing the selected intents, and at step 818, the CCS 150 may provide a second response to the customer at one of the customer devices 110(1)-110(n) based on at least one of: the received agent-identified-information or the agent-modified-information.

In accordance with the examples described in the present disclosure, it may be understood that the human agent at one of the agent devices 130(1)-130(n) may not directly participate in the conversation with the customer at one of the customer devices 110(1)-110(n) but instead assist the CCS 150 in the background. In other words, the human agent at one of the agent devices 130(1)-130(n) may only monitor the conversation between the CCS 150 and the customer at one of the customer devices 110(1)-110(n) and assist the CCS 150 in the background to handle the conversation.

Further, in accordance with the invention described above, by presenting the conversation transcript and the context form 214 side-by-side in the agent device GUI 132, the human agent at one of the agent devices 130(1)-130(n) gets a quick view of the conversation status, thereby reducing time of identifying a problem and providing a resolution. Further, the information added or modified by the human agent at one of the agent devices 130(1)-130(n) in the context form 214 may be highlighted for easy reference to the human agent or other human agents at one or more of the agent devices 130(1)-130(n) of the contact center. Further, the information added by the human agent at one of the agent devices 130(1)-130(n) in the context form 214 may be tagged and mapped to the relevant portion of the conversation transcript, so that when the human agent at one of the agent devices 130(1)-130(n) selects the one or more intents, the one or more entities, or the one or more entity values in the context form 214, the corresponding portion in the conversation transcript may be highlighted for easy reference. Further, the modified context forms may be used for training the human agents at one or more of the agent devices 130(1)-130(n), the CCS 150, or the plurality of virtual assistants 164(1)-164(n) of the CCS 150. Further, the modified context forms may be used as cross reference by the human agents at one or more of the agent devices 130(1)-130(n) when dealing with similar conversations at a later point of time. Furthermore, assisting and training the CCS 150 by the human agent at one of the agent devices 130(1)-130(n) using the context form 214 helps the CCS 150 to handle complex conversations over a period of time.

In accordance with the methods, systems, and non-transitory computer-readable mediums described above, the contact centers may reduce average handling time (AHT) and improve key performance indicators (KPIs) such as, for example, customer satisfaction score (CSAT), customer effort score (CES), net promoter score (NPS), first-call resolution, service level, contact quality, and human agents performance, although other KPIs may be considered.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method comprising:
   providing, by a contact center server (CCS), to an agent device a list of conversations between one or more customer devices and a virtual assistant managed by the CCS;
   pausing, by the CCS, a conversation from the list of conversations between one of the one or more customer devices and the virtual assistant based on an instruction received from the agent device;
   receiving, by the CCS, for the paused conversation from the agent device at least one of: agent-identified-information or agent-modified-information that is unidentified by the virtual assistant;
   automatically associating, by the CCS, entity values identified by the virtual assistant in the paused conversation to the received at least one of: the agent-identified-information or the agent-modified-information; and
   resuming, by the CCS, the paused conversation based on at least one of: the agent-identified-information or the agent-modified-information; and the associated entity values.

2. The method of claim 1, further comprising: presenting one or more graphical user interface options to the agent device to provide at least one of: the agent-identified-information or the agent-modified-information.

3. The method of claim 1, wherein the agent-identified-information includes one or more new intents.

4. The method of claim 1, wherein the agent-modified-information includes modification of one or more intents identified by the CCS.

5. The method of claim 1, wherein the agent-identified-information or the agent-modified-information is used to train the virtual assistant.

6. The method of claim 1, wherein the agent-identified-information or the agent-modified information is used for at least one of: intent or entity training of the virtual assistant.

7. A contact center server (CCS) comprising:
one or more processors; and
a memory coupled to the one or more processors which are configured to execute programmed instructions stored in the memory to:
provide to an agent device a list of conversations between one or more customer devices and a virtual assistant managed by the CCS;
pause a conversation from the list of conversations between one of the one or more customer devices and the virtual assistant based on an instruction received from the agent device;
receive for the paused conversation from the agent device at least one of: agent-identified-information or agent-modified-information that is unidentified by the virtual assistant;
automatically associate entity values identified by the virtual assistant in the paused conversation to the received at least one of: the agent-identified-information or the agent-modified-information; and
resume the paused conversation based on at least one of: the agent-identified-information or the agent-modified-information; and the associated entity values.

8. The CCS of claim 7, wherein the one or more processors are further configured to execute programmed instructions stored in the memory to present one or more graphical user interface options to the agent device to provide at least one of: the agent-identified-information or the agent-modified-information.

9. The CCS of claim 7, wherein the agent-identified-information includes one or more new intents.

10. The CCS of claim 7, wherein the agent-modified-information includes modification of one or more intents identified by the CCS.

11. The CCS of claim 7, wherein the agent-identified-information or the agent-modified-information is used to train the virtual assistant.

12. The CCS of claim 7, wherein the agent-identified-information or the agent-modified information is used for at least one of: intent or entity training of the virtual assistant.

13. A non-transitory computer readable medium storing instructions which when executed by one or more processors, causes the one or more processors to:
provide to an agent device a list of conversations between one or more customer devices and a virtual assistant managed by the CCS;
pause a conversation from the list of conversations between one of the one or more customer devices and the virtual assistant based on an instruction received from the agent device;
receive for the paused conversation from the agent device at least one of: agent-identified-information or agent-modified-information that is unidentified by the virtual assistant;
automatically associate entity values identified by the virtual assistant in the paused conversation to at least one of: the agent-identified-information or the agent-modified-information; and
resume the paused conversation based on at least one of: the agent-identified-information or the agent-modified-information; and the associated entity values.

14. The non-transitory computer-readable medium of claim 13, wherein the instructions further comprise executable code which when executed by the one or more processors, causes the one or more processors to: present one or more graphical user interface options to the agent device to provide at least one of: the agent-identified-information or the agent-modified-information.

15. The non-transitory computer-readable medium of claim 13, wherein the agent-identified-information includes one or more new intents.

16. The non-transitory computer-readable medium of claim 13, wherein the agent-modified-information includes modification of one or more intents identified by the CCS.

17. The non-transitory computer-readable medium of claim 13, wherein the agent-identified-information or the agent-modified-information is used to train the virtual assistant.

18. The non-transitory computer-readable medium of claim 13, wherein the agent-identified-information or the agent-modified information is used for at least one of: intent or entity training of the virtual assistant.

* * * * *